United States Patent
Jedari Zare Zadeh et al.

(10) Patent No.: US 12,500,522 B2
(45) Date of Patent: Dec. 16, 2025

(54) FLYING CAPACITOR PRIMARY SIDE CIRCUIT FOR ISOLATED DC/DC CONVERTER

(71) Applicant: Infineon Technologies Canada Inc, Ottawa (CA)

(72) Inventors: Mahdi Jedari Zare Zadeh, Ottawa (CA); Juncheng Lu, Kanata (CA)

(73) Assignee: Infineon Technologies Canada Inc., Ottawa (CA)

( * ) Notice: Subject to any disclaimer, the term of this patent is extended or adjusted under 35 U.S.C. 154(b) by 276 days.

(21) Appl. No.: 18/310,416

(22) Filed: May 1, 2023

(65) Prior Publication Data
US 2024/0372478 A1    Nov. 7, 2024

(51) Int. Cl.
*H02M 3/335* (2006.01)
*H02M 1/00* (2007.01)
*H02M 7/483* (2007.01)

(52) U.S. Cl.
CPC ..... *H02M 3/33569* (2013.01); *H02M 1/0058* (2021.05); *H02M 7/4837* (2021.05)

(58) Field of Classification Search
CPC ......... H02M 3/33569; H02M 3/33576; H02M 3/33573; H02M 7/4837; H02M 1/0077; H02M 1/0095
See application file for complete search history.

(56) References Cited

U.S. PATENT DOCUMENTS

| | | | |
|---|---|---|---|
| 6,349,044 B1* | 2/2002 | Canales-Abarca | H02M 1/34 363/56.08 |
| 12,191,775 B2* | 1/2025 | Zhang | H02M 1/0009 |
| 2018/0183345 A1* | 6/2018 | Itoh | H02M 1/32 |
| 2022/0271684 A1* | 8/2022 | Iyasu | H02M 3/33573 |
| 2022/0376624 A1* | 11/2022 | Bae | H02M 3/1584 |
| 2023/0179108 A1* | 6/2023 | Jia | H02M 3/33592 363/17 |
| 2024/0223097 A1* | 7/2024 | Zayed | H02J 7/02 |
| 2025/0055378 A1* | 2/2025 | Elezab | H02M 3/33573 |

FOREIGN PATENT DOCUMENTS

EP      2975753 B1 * 11/2021 ........ H02M 3/33561

* cited by examiner

*Primary Examiner* — Sisay G Tiku
(74) *Attorney, Agent, or Firm* — WORKMAN NYDEGGER

(57) ABSTRACT

A voltage converter circuit including a primary side circuit including four transistors connected in series between two voltage application nodes, and two capacitors coupled in series between the two voltage application nodes. A flying capacitor is connected between first circuit node and a second circuit node, where the first circuit node is between the first and second transistors in the transistor series, and the second circuit node is between the third and fourth transistors in the transistor series. A primary side transformer is connected between a third circuit node and a fourth circuit node, where the third circuit node is between the second and third transistors in the transistor series, and the fourth circuit node is between the first and second capacitors in the capacitor series.

17 Claims, 11 Drawing Sheets

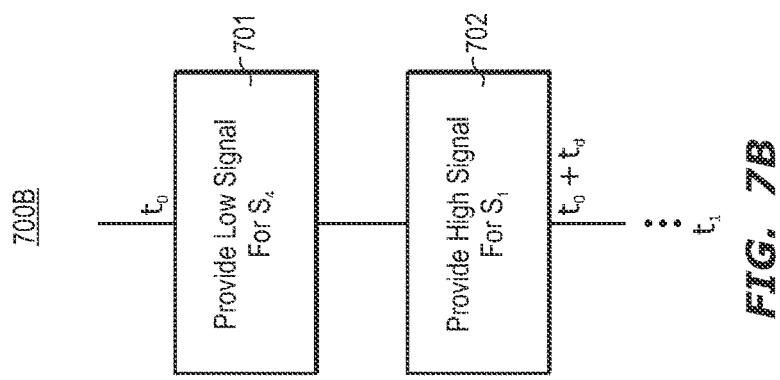
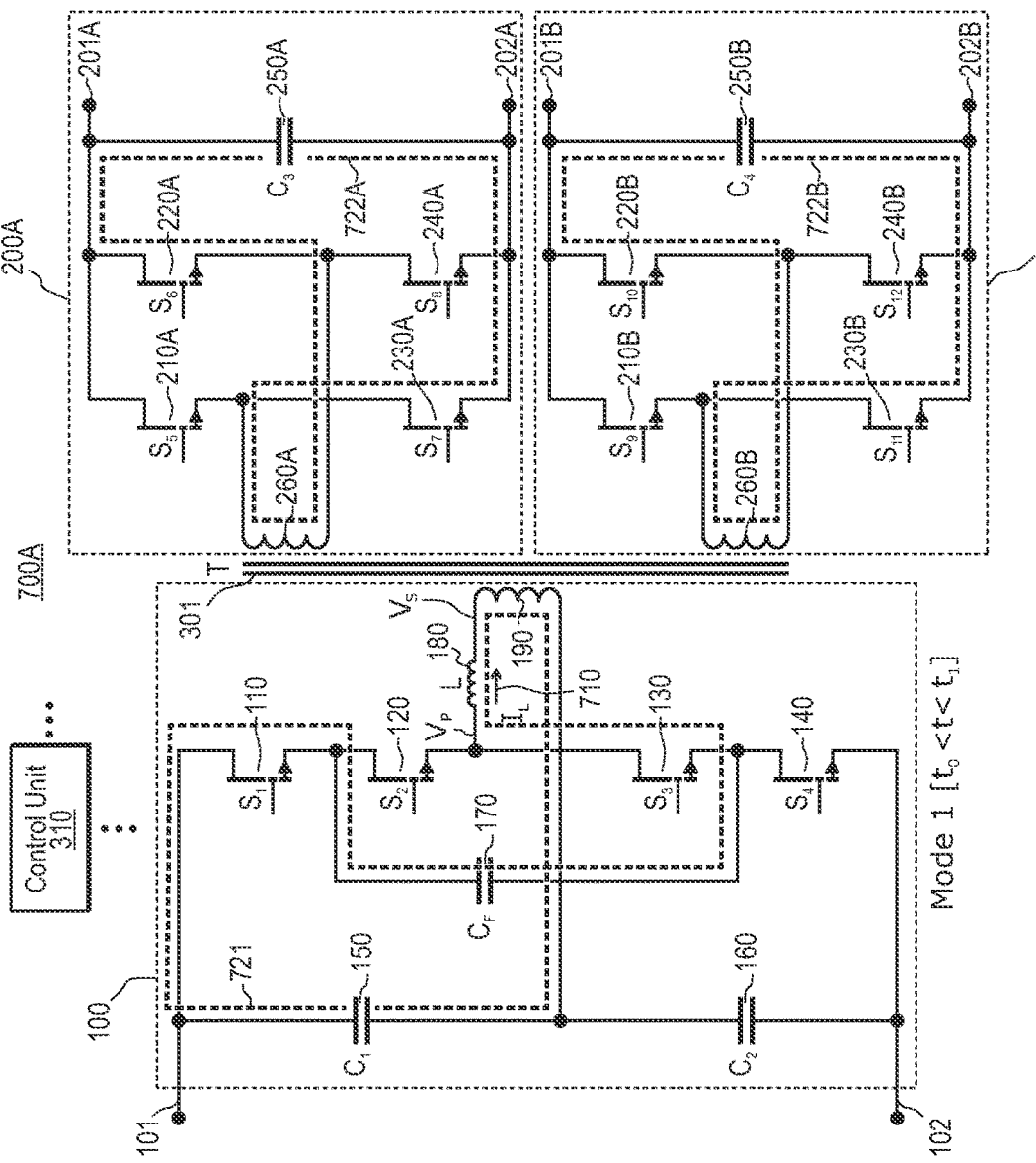
FIG. 7B
FIG. 7A

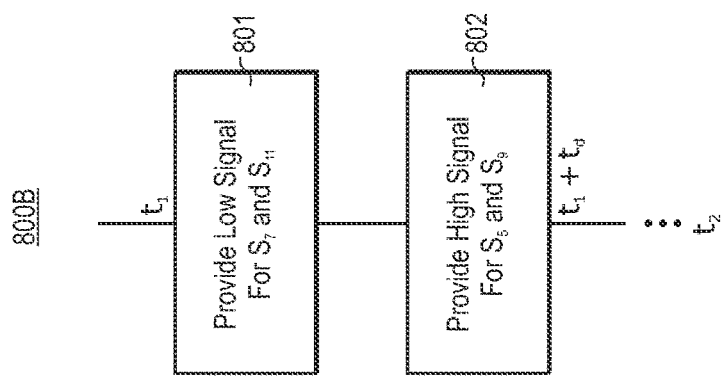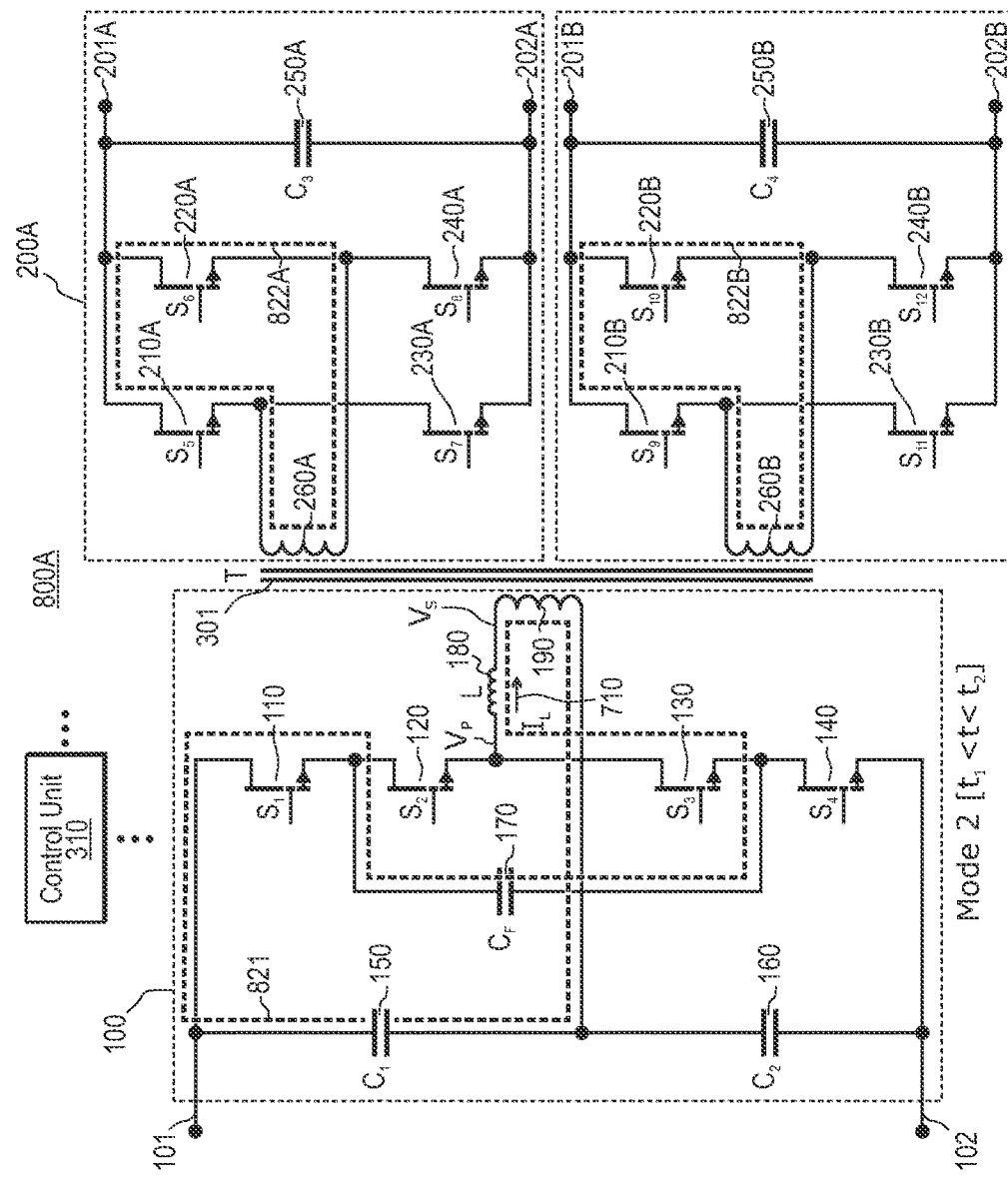
FIG. 8B
FIG. 8A

FLYING CAPACITOR PRIMARY SIDE CIRCUIT FOR ISOLATED DC/DC CONVERTER

BACKGROUND OF THE INVENTION

Electronic circuits typically include transistors, which function as electronic switches that regulate or control current flow in portions of the circuit. One type of transistor is a field-effect transistor in which a voltage is applied to a gate terminal to turn the transistor on and off. A semiconductor channel region is disposed between the drain terminal and the source terminal. When the transistor is on, current flows through the semiconductor channel region between the source terminal and the drain terminal. When the transistor is off, lesser or no current flows through the semiconductor channel region between the source terminal and the drain terminal. The gate terminal is disposed over the semiconductor channel region between the source terminal and the drain terminal. Voltage on the gate terminal generates a field that affects whether the semiconductor channel region conducts current—hence the term "field-effect transistor".

Nevertheless, there are other types of transistors. In each transistor, current flows from an input node to an output node through a channel when the transistor is turned on by applying a sufficient voltage to a control node. For instance, in a field-effect transistor, the control node would be the gate terminal, the input node would be one of the source or drain terminals, and the output node would be the other of the source or drain terminals.

Typical transistors are used for amplifying and switching purposes in electronic circuits. On the other hand, power transistors are used to convey more substantial current, have higher voltage ratings, and may more typically be used in power supplies, battery charging, and the like. Power transistors can typically operate with currents greater than 1 amp to as much as a hundred amps or even greater. Power transistors may convey power greater than 1 watt to as many as hundreds of watts or even greater.

Power transistors are also used for switching purposes in high voltage DC/DC converters. DC/DC converters are used to safely convert an input DC voltage to another DC voltage required by a load device. For example, DC/DC converters are frequently used in power supplies for electronic devices (e.g., laptops, smartphones, tablets, etc.), automotive devices, solar power systems, industrial control systems, and telecommunications networks. High power DC/DC converter circuits typically use a transformer or the like to physically separate an input-side circuit from an output-side circuit such that direct current itself does not flow between the input-side circuit and the output-side circuit, while allowing electrical interaction via the transformer. Such DC/DC converter circuits are often termed an "isolated power converter". The physical separation protects the circuit as well as any sensitive loads from power surges, and so forth.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to a voltage converter circuit for converting an input DC voltage to an output DC voltage. The voltage converter circuit includes a primary side circuit. However, to be operational, the voltage converter circuit would also have a secondary side circuit in which the primary side is inductively coupled to the secondary side using a transformer. As for the primary side, the primary side circuit includes four switches connected in series between two voltage application nodes. As an example, the two voltage application nodes may be nodes across which an input DC voltage is applied, or onto which an output DC voltage is applied. The primary side circuit also includes two capacitors coupled in series between these two voltage application nodes.

A flying capacitor is connected between first circuit node and a second circuit node, where the first circuit node is between the first and second transistors in the transistor series, and the second circuit node is between the third and fourth transistors in the transistor series. Furthermore, a primary side transformer coil is connected between a third circuit node and a fourth circuit node, where the third circuit node is between the second and third transistors in the transistor series, and the fourth circuit node is between the first and second capacitors in the capacitor series.

In this circuit, a high voltage difference can be applied between the first voltage application node and the second voltage application node, such that only half of that voltage difference occurs over any one of the four switches. Therefore, smaller switches can be used in the primary side circuit compared to if the entire voltage difference occurred over one of any of the four switches. This allows the overall size of the primary side circuit to be reduced, while still allowing for high voltage application, thus increasing the power density capabilities of the primary side circuit. Further, such smaller switches also have lower output capacitances, allowing for faster switching, including Zero Volt Switching (or ZVS).

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which:

FIG. 7A illustrates the voltage converter circuit operating in a state that represents operating in mode 1 from time $t_0$ to $t_1$.

FIG. 7B illustrates a flowchart of method that describes the order in which the various switches of the voltage converter circuit are switched in order to accomplish mode 1.

FIG. 8A illustrates the voltage converter circuit operating in a state that represents operating in mode 2 from time $t_1$ to $t_2$.

FIG. 8B illustrates a flowchart of a method that describes the order in which the various switches of the voltage converter circuit are switched in order to accomplish mode 2.

DETAILED DESCRIPTION OF THE INVENTION

Embodiments described herein relate to a voltage converter circuit for converting an input DC voltage to an output DC voltage. The voltage converter circuit includes a primary side circuit. However, to be operational, the voltage converter circuit would also have a secondary side circuit in which the primary side is inductively coupled to the secondary side using a transformer. As for the primary side, the primary side circuit includes four switches connected in series between two voltage application nodes. As an example, the two voltage application nodes may be nodes across which an input DC voltage is applied, or onto which an output DC voltage is applied. The primary side circuit also includes two capacitors coupled in series between these two voltage application nodes.

A flying capacitor is connected between a first circuit node and a second circuit node, where the first circuit node is between the first and second switches in the switch series, and the second circuit node is between the third and fourth switches in the switch series. Furthermore, a primary side transformer coil is connected between a third circuit node and a fourth circuit node, where the third circuit node is between the second and third transistors in the transistor series, and the fourth circuit node is between the first and second capacitors in the capacitor series.

Figure 1:
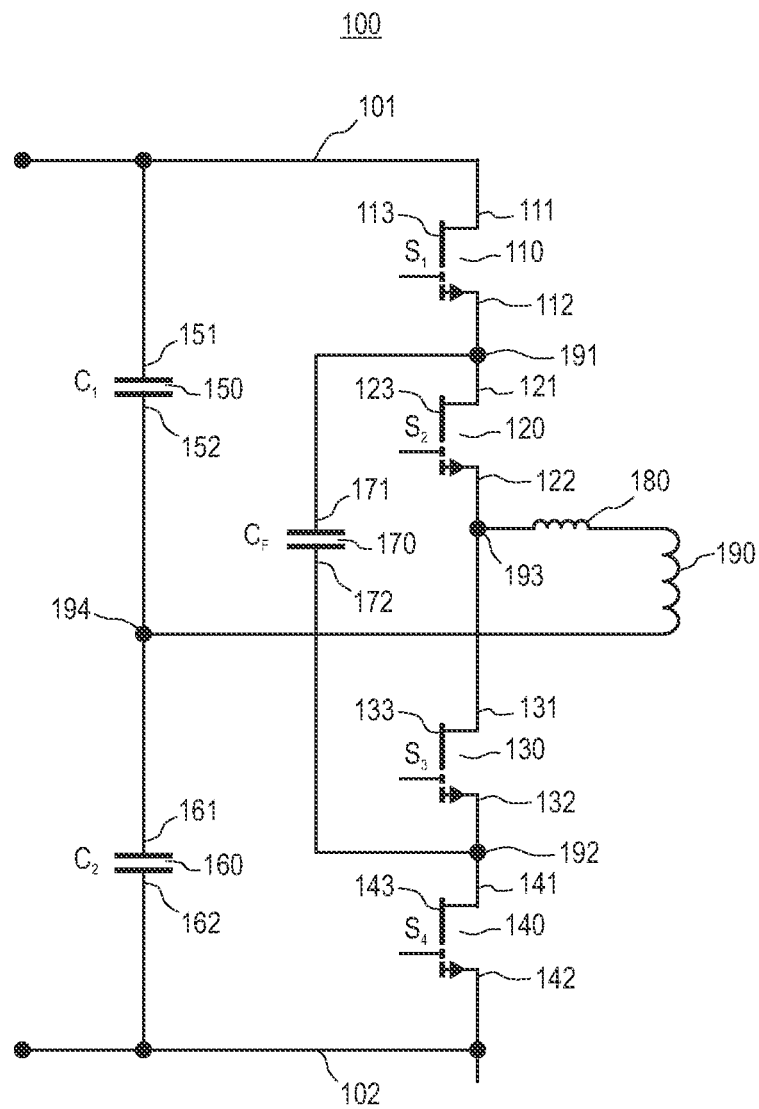
FIG. 1 illustrates a primary side circuit, in accordance with the principles described herein.

FIG. 1 illustrates a primary side circuit 100, in accordance with the principles described herein. The primary side circuit 100 is an example of a primary side of a voltage converter circuit. Example secondary sides of the circuit will be described later. Accordingly, for now, focus is on the primary side circuit 100. That said, the voltage converter circuit in some embodiments is bi-directional. Accordingly, the label "primary" and "secondary" are used merely to distinguish one side of the voltage converter circuit from another. These modifying terms do not represent which side of the voltage converter circuit receives the input voltage to be converted, and which side of the voltage converter circuit generates the output voltage.

The primary side circuit 100 includes a first voltage application node 101, a second voltage application node 102, and various other components that will be described. In the case of an input voltage being applied to the primary side circuit 100, the first voltage application node 101 and the second voltage application node 102 may be nodes across which an input DC voltage is applied. In the case of the output voltage being provided by the primary side circuit 100, the first voltage application node 101 and the second voltage application node 102 may be nodes across which the output DC voltage is applied.

The primary side circuit 100 also includes four switches 110, 120, 130 and 140, amongst other elements later described. The switches 110, 120, 130 and 140 may be any transistor capable of transferring current. Each of the switches 110, 120, 130 and 140 has an input node, an output node, and a control node. Current flows between the input node and the output node in response to a signal applied to the control node. For example, the switch 110 has an input node 111, an output node 112 and a control node 113. Furthermore, the switch 120 has an input node 121, an output node 122 and a control node 123. In addition, the switch 130 has an input node 131, an output node 132 and a control node 133. Finally, the switch 140 has an input node 141, an output node 142 and a control node 143. Each of the switches 110, 120, 130 and 140 may be controlled via the application of respective control signals $S_1$, $S_2$, $S_3$ and $S_4$ to their respective control nodes 113, 123, 133 and 143.

The switches 110, 120, 130 and 140 are connected in series between the first voltage application node 101 and the second voltage application node 102. For each of these switches 110, 120, 130 and 140, the node that is most proximate in the series to the first voltage application node 101 will be referred to herein as the "input node", and the node that is most proximate in the series to the second voltage application node 102 will be referred to as the "output node". Most times, current will flow through the switch from the input node to the output node. However, there may be times when the current flows in the opposite direction from the output node to the input node, depending on the mode of operation of the primary side circuit 100.

In the example of the switches 110, 120, 130 and 140 being field-effect transistors, the control node would correspond to a gate terminal, the input node would correspond to one of either a drain terminal or a source terminal, and the output node would correspond to the other of the drain terminal or source terminal. Furthermore, if the switches 110, 120, 130 and 140 were field-effect transistors, the control signals $S_1$, $S_2$, $S_3$ and $S_4$ would be applied gate voltage signals. In one embodiment, the output terminals of each of the field-effect transistors is the source terminal (as shown in FIG. 1), and the input terminals of each of the field-effect transistors is the drain terminal (as also shown in FIG. 1).

The primary side circuit 100 also includes three capacitors 150, 160 and 170. The capacitors 150 and 160 are also coupled in series between the first voltage application node 101 and the second voltage application node 102. The capacitor 170 is connected between circuit nodes 191 and 192. The circuit node 191 is in the switch series between the switches 110 and 120. The circuit node 192 is in the switch series between the switches 130 and 140. The capacitor 170 may be referred to as a "flying capacitor", due to the capacitor 170 not being connected to a fixed voltage source. Each of the capacitors 150, 160 and 170 has two capacitor nodes. More specifically, the capacitor 150 has capacitor nodes 151 and 152, the capacitor 160 has capacitor nodes 161 and 162, and the capacitor 170 has capacitor nodes 171 and 172.

Furthermore, the primary side circuit 100 also includes a primary side transformer coil 190 which is connected between circuit nodes 193 and 194. The circuit node 193 is in the switch series between the switches 120 and 130. The circuit node 194 is in the capacitor series between the capacitors 150 and 160. Further, the primary side circuit 100 is shown to have a parasitic inductor 180 connected in series with the primary side transformer coil 190. The parasitic inductor 180 represents the leakage inductance of the transformer that would connect the primary side circuit 100 to a secondary side circuit. An example of a secondary side circuit will now be described with respect to FIG. 2.

Figure 2:
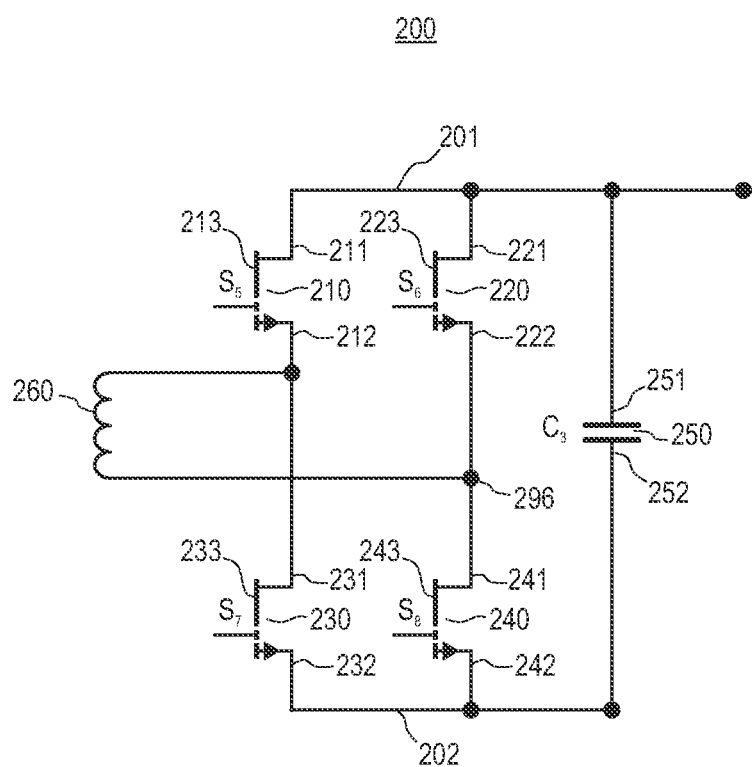
FIG. 2 illustrates a secondary side circuit that may be used with the primary side circuit.

FIG. 2 illustrates a secondary side circuit 200, in accordance with the principles described herein. The secondary side circuit 200 is an example of a secondary side of a voltage converter circuit. For example, the secondary side circuit 200 may complement the primary side circuit 100 of FIG. 1 to create a voltage converter circuit. Specifically, the primary side transformer coil 190 (see FIG. 1) may induce a current in a secondary side transformer coil 260 (see FIG. 2) when the primary side circuit 100 receives an input voltage and an output voltage is to be applied by the secondary side circuit 200. On the other hand, the secondary side transformer coil 260 may induce a current in the primary side transformer coil 190 when the secondary side circuit 200 receives an input voltage and an output voltage is to be applied by the primary side circuit 100.

The secondary side circuit 200 includes a first voltage application node 201, a second voltage application node 202, and various other components that will be described. In the case of an input voltage being applied to the secondary side circuit 200, the first voltage application node 201 and the second voltage application node 202 may be nodes across which an input DC voltage is applied. In the case of the output voltage being provided by the secondary side circuit 200, the first voltage application node 201 and the second voltage application node 202 may be nodes across which the output DC voltage is applied.

The secondary side circuit 200 includes four switches 210, 220, 230 and 240. The switches 210, 220, 230 and 240 may be any transistor capable of transferring current, such as for example field-effect transistors. The switches 210, 220, 230 and 240 respectively have input nodes 211, 221, 231 and 241; output nodes 212, 222, 232 and 242; and control nodes 213, 223, 233 and 243. Each of the switches 210, 220, 230 and 240 may be controlled via the application of respective control signals $S_5$, $S_6$, $S_7$ and $S_8$ to their respective control nodes 213, 223, 233 and 243.

The switches 210 and 230 are connected in series between the first voltage application node 201 and the second voltage application node 202. The switches 220 and 240 are also connected in series between the first voltage application node 201 and the second voltage application node 202.

The secondary side circuit 200 also includes a capacitor 250. The capacitor 250 is connected between the first voltage application node 201 and the second voltage application node 202. Further, the capacitor 250 also has two capacitor nodes 251 and 252. Furthermore, the secondary side transformer coil 260 is connected between circuit nodes 295 and 296. The circuit node 295 is in the connection between the switches 210 and 230. The circuit node 296 is in the connection between the switches 220 and 240.

Figure 3:
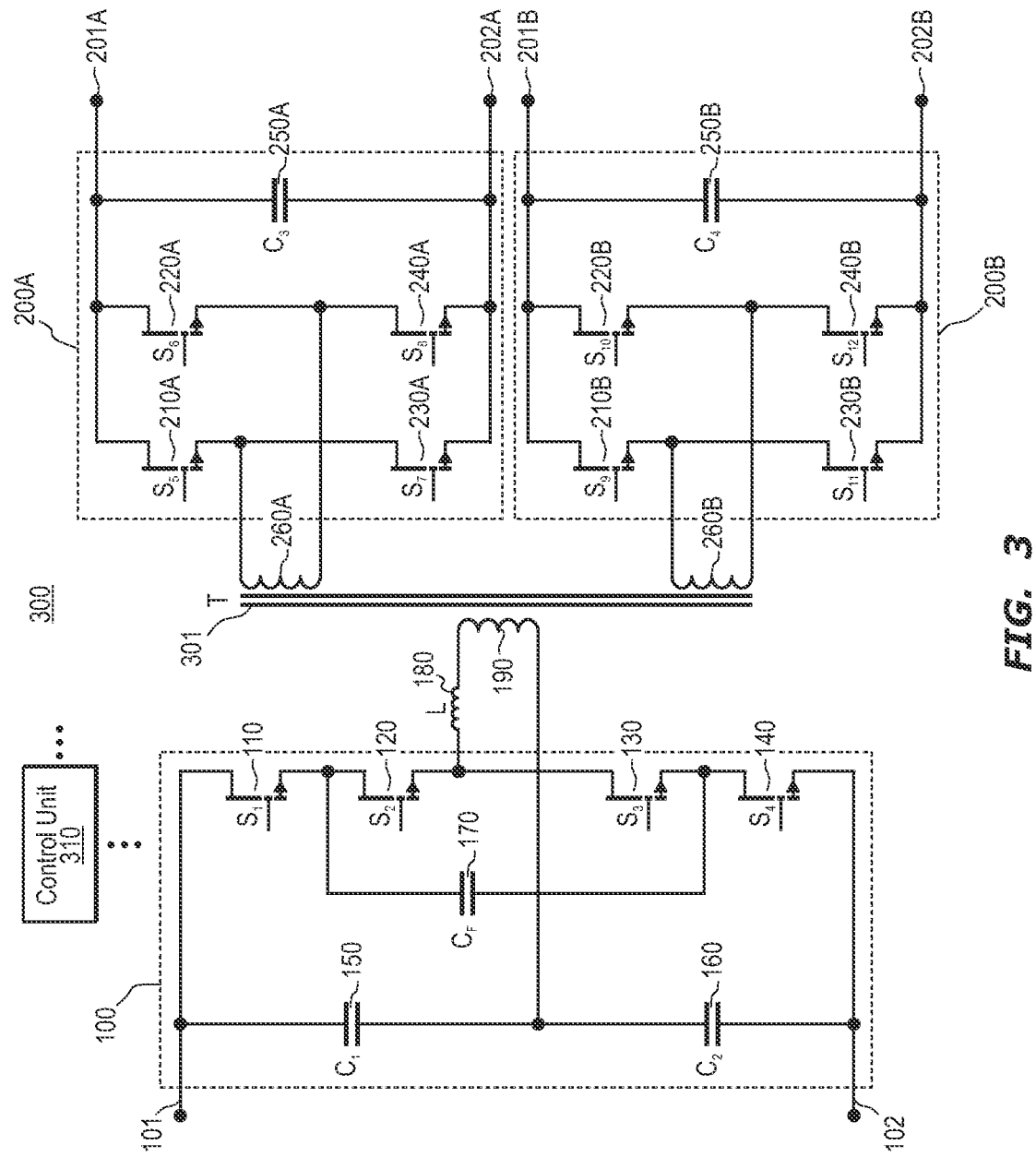
FIG. 3 illustrates a voltage converter circuit, which includes the primary side circuit of FIG. 1, and two instance of the secondary side circuit of FIG. 2.

FIG. 3 illustrates a voltage converter circuit 300, in accordance with the principles described herein. The voltage converter circuit 300 includes the primary side circuit 100 of FIG. 1 as well as two instances of the secondary side circuit 200 of FIG. 2, which interact with each other via a transformer 301. Further, the voltage converter circuit 300 includes a control unit 310, which will be described later. One instance of the secondary side circuit 200 is labelled as the secondary side circuit 200A that includes the secondary side transformer coil 260A. Another instance of the secondary side circuit 200 is labelled as the secondary side circuit 200B that includes another secondary side transformer coil 260B. The primary side transformer coil 190 of the primary side 100 is connected via the transformer 301 to each of the secondary side transformer coils 260A and 260B of the respective secondary side circuits 200A and 200B.

The elements of the secondary side circuit 200A of FIG. 3 are labelled the same as the elements of the secondary side circuit 200 of FIG. 2, but with the addition of the suffix "A". Furthermore, the elements of the secondary side circuit 200B of FIG. 3 are labelled the same as the elements of the secondary side circuit 200 of FIG. 2, but with the addition of the suffix "B".

As previously described with respect to FIG. 1, the switches 110, 120, 130 and 140 of the primary side circuit 100 are controlled via respective switch signals $S_1$, $S_2$, $S_3$ and $S_4$. The switches 210A, 220A, 230A and 240A of the secondary side circuit 200A are controlled via respective switch signals $S_5$, $S_6$, $S_7$ and $S_8$. The switches 210B, 220B, 230B and 240B of the secondary side circuit 200B are controlled via respective switch signals $S_9$, $S_{10}$, $S_{11}$ and $S_{12}$. The control unit 310 generates each of the switch signals $S_1$ through $S_{12}$, and thus is used to control each of the switches 110, 120, 130, 140, 210A, 220A, 230A, 240A, 210B, 220B, 230B and 240B.

While not all DC/DC converter circuits use transformers, high power DC/DC converter circuits use transformers to physically separate an input-side circuit from an output-side circuit, while allowing inductive electrical interaction via the transformer. Such circuits are typically referred to as "isolated power converters". The physical separation protects the high power DC/DC converter circuit as well as any sensitive loads from power surges.

Switches are used in both the input-side and output-side of the isolated power converters to force particular current levels and changes through the transformers at appropriate times such that the input-side circuit and the output-side circuit cooperatively interact to perform the conversion. By changing the duty cycle of the switches, different output DC voltage levels can be obtained. Switches are also used to control the current through the transformer coils in a manner that avoids transformer saturation. To understand transformer saturation, a brief description about transformers will be set forth.

A transformer typically consists of two or more coils of wire wrapped around a magnetic core, the magnetic core being made of a material such as iron or steel. For example, the voltage converter circuit 300 of FIG. 3 includes the primary side transformer coil 190 and secondary transformer coils 260A and 260B. Current through the primary side transformer coil causes a magnetic field that induces another current through the secondary side transformer coils through electromagnetic induction. A transformer magnetic core serves as a more permissive conduit (as compared to a vacuum) for such a magnetic field, thereby improving the efficiency of the transformer. However, there are limits to the amount of magnetic flux that can pass through a magnetic core. Accordingly, the transformer most efficiently operates when the current through the transformer coils is carefully controlled.

The voltage converter circuit 300 of FIG. 3 is an isolated power converter. That is, the transformer 301 is used to physically separate the primary side circuit 100 from the two instances of the secondary side circuit 200A and 200B, while still allowing inductive electrical interaction via the transformer 301. Furthermore, the switches in which the primary side circuit 100 and the secondary side circuits 200A and 200B may also be operated to perform the DC/DC conversion, as will be explained further below with respect to FIGS. 6 through 10.

Figure 4:
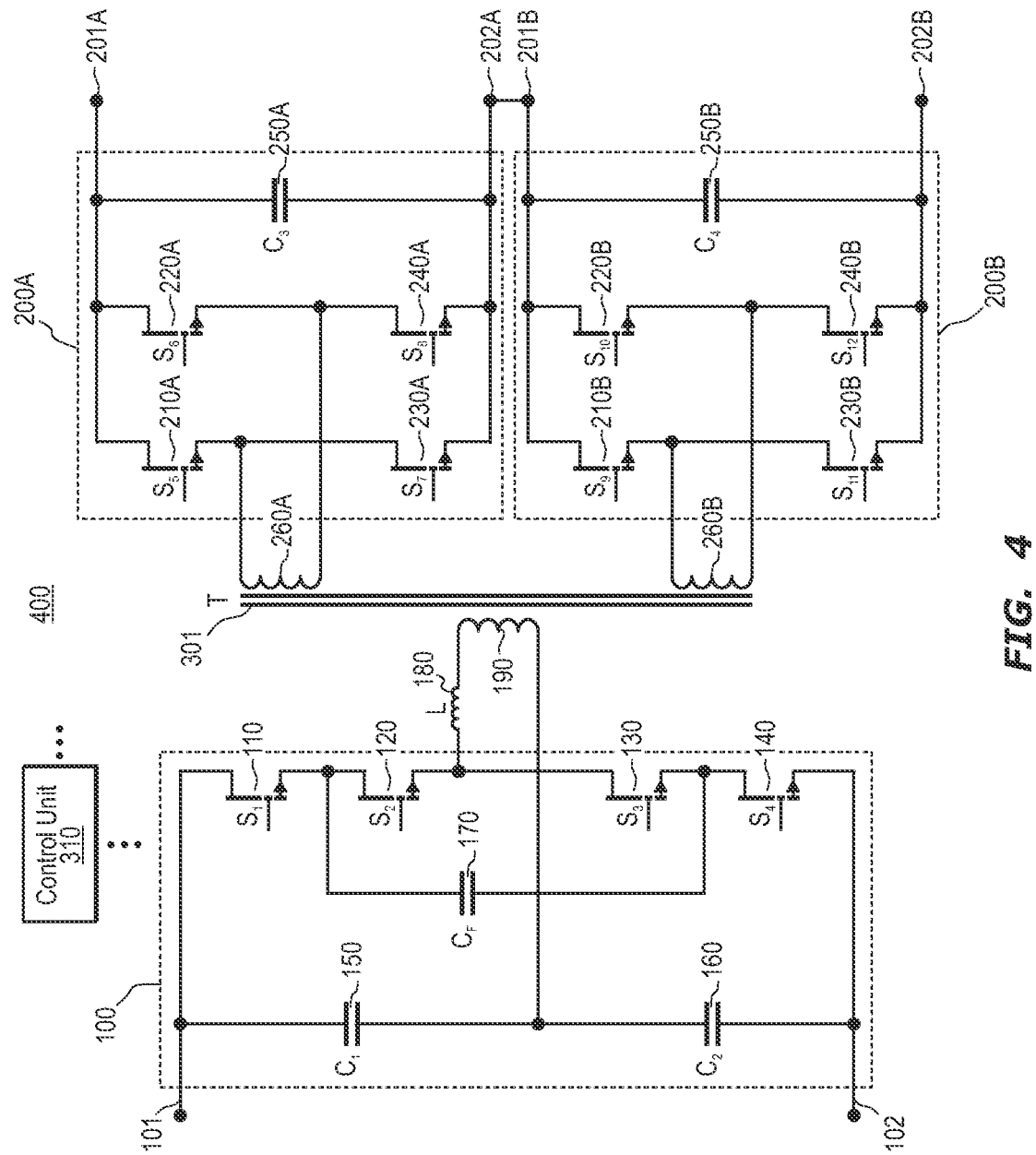
FIG. 4 illustrates a voltage converter circuit having secondary side circuits connected in series.
Figure 5:
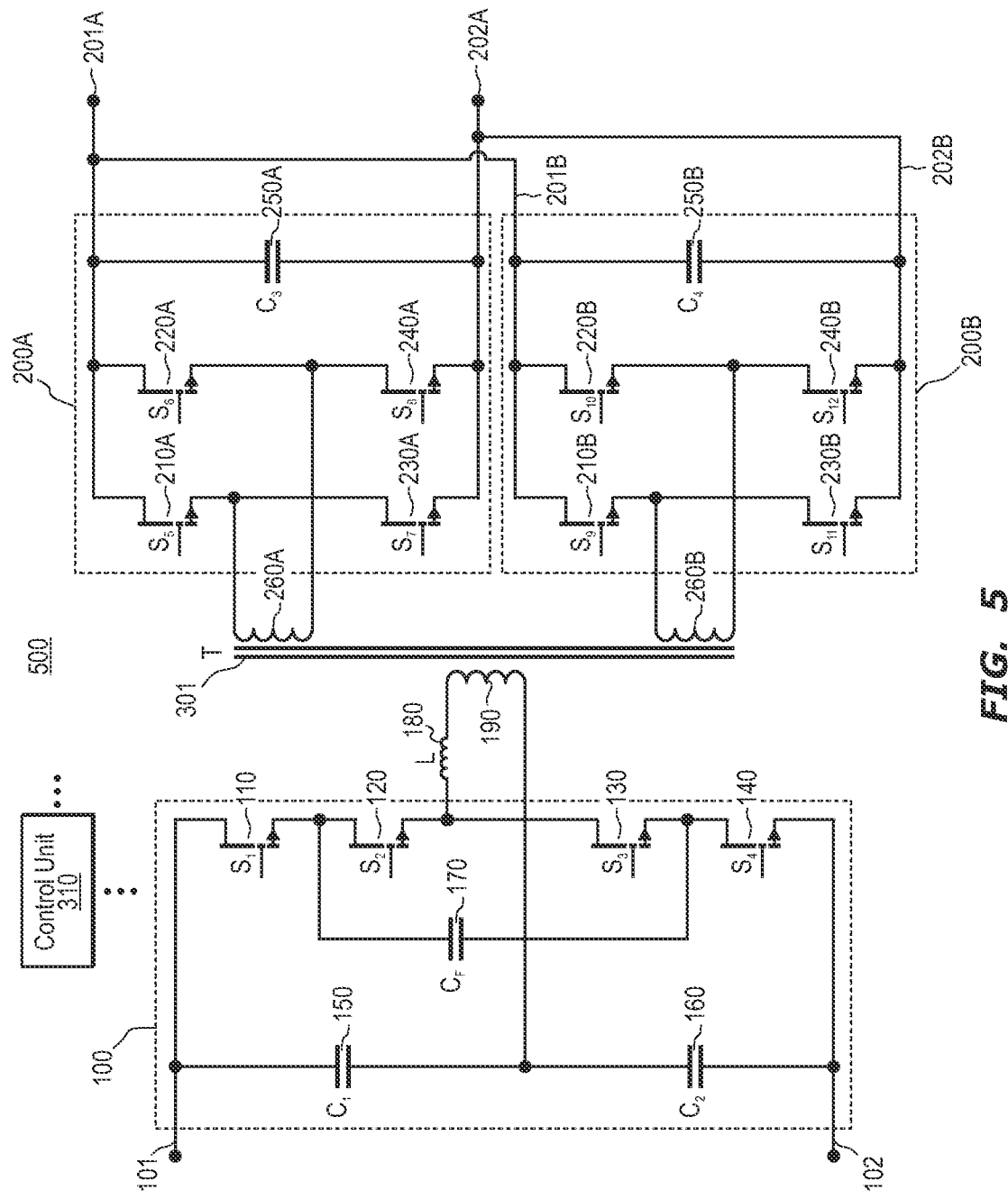
FIG. 5 illustrates a voltage converter circuit having secondary side circuits connected in parallel.

The voltage converter circuit 300 of FIG. 3 can be used to perform different DC voltage conversions. Firstly, by adjusting the duty cycle of the signals $S_1$ through $S_{12}$, the output DC voltage can be adjusted to give a certain input voltage. Furthermore, by adjusting how the voltage application nodes 201A, 202A, 201B and 202B are configured, one can also adjust the output DC voltage. FIGS. 4 and 5 show examples of how the voltage application nodes 201A, 202A, 201B and 202B may be configured to do this.

FIG. 4 illustrates a voltage converter circuit 400, which is an example of the voltage converter circuit 300 of FIG. 3, with the secondary side circuits 200A and 200B connected in series with each other between voltage application nodes 201A and 202B. Specifically, the voltage application node 202A of the secondary side circuit 200A is connected to the voltage application node 201B of the secondary side circuit 200B. Thus, the voltage across the voltage application nodes 201A and 202B represents the output DC voltage, and is a sum of the DC voltage across the voltage application nodes 201A and 202A of the secondary side circuit 200A, and the DC voltage across the voltage application nodes 201B and 202B of the secondary side circuit 200B.

As an example, suppose that the primary side circuit 100 is being used as the input side of the voltage converter circuit 400, that the secondary side circuits 200A and 200B are being used as the output side of the voltage converter circuit 400, and that there are no power losses between the input side and the output side of the voltage converter circuit 400. Furthermore, suppose that the duty cycles of each of the switches $S_1$ through $S_{12}$ are adjusted via the control unit 310 such that the output voltage across the voltage application nodes 201A and 202A of the secondary side circuit 200A is 400 volts given an input voltage across the voltage application nodes 101 and 102 of 800 volts. Similarly, suppose that the duty cycles of each of the switches $S_1$ through $S_{12}$ are adjusted via the control unit 310 such that the output voltage across the voltage application nodes 201B and 202B of the secondary side circuit 200B is also 400 volts given an input voltage across the voltage application nodes 101 and 102 of 800 volts. In this case, the voltage converter circuit 400 could be used to apply a higher output voltage of 800 volts.

FIG. 5 illustrates a voltage converter circuit 500, which is an example of the voltage converter circuit 300 of FIG. 3, with the secondary side circuits 200A and 200B connected in parallel with each other. Specifically, the voltage application node 201A of the secondary side circuit 200A is connected to the voltage application node 201B of the secondary side circuit 200B, and the voltage application node 202A of the secondary side circuit 200A is connected to the voltage application node 202B of the secondary side circuit 200B. In this way, the entire output voltage of the secondary side is applied across the voltage application nodes 201A and 202A, and the entire output voltage of the secondary side is also applied across the voltage application nodes 201B and 202B.

As an example, suppose again that the primary side circuit 100 is being used as the input side of the voltage converter circuit 500, that the secondary side circuits 200A and 200B are being used as the output side of the voltage converter circuit 500, and that there are no power losses between the input side and the output side of the voltage converter circuit 500. Suppose again that the duty cycles of the various switches $S_1$ through $S_{12}$ are controlled via the control unit 310 such that the output of the secondary side circuit 200A expressed across the voltage application nodes 201A and 202A is 400 volts given an input voltage of 800 volts across the voltage application nodes 101 and 102 of the primary side circuit 100. Suppose again that duty cycles of the various switches $S_1$ through $S_{12}$ are controlled via the control unit 310 such that the output of the secondary side circuit 200B expressed across the voltage application nodes 201B and 202B is 400 volts given an input voltage of 800 volts across the voltage application nodes 101 and 102 of the primary side circuit 100. In this case, the output DC voltage would be merely 400 volts given an input DC voltage of 800 volts.

In the voltage converter circuit 300 of FIG. 3, the control unit 310 is used to supply the switch signals $S_1$ through $S_{12}$ that turn on and turn off each of the switches in different patterns that will be referred to hereinafter as "modes". These various modes are used to induce an alternating current through the primary side transformer coil 190.

For context, transformers are built to operate using an alternating current in a specific frequency range based on the intended use of the transformer. For example, transformers used in commercial and residential power systems are built to operate in a frequency range as low as around 50-60 Hz, depending on local power grid systems. On the other hand, transformers used in switch-mode power supplies, audio amplifiers or DC/DC power converters may be built to operate in a frequency range from as low as 10 kHz to as high as 20 MHz. That said, the principles described herein are not limited to what frequency range in which the transformer 301 may best operate.

Regardless of the specific frequency range of the transformer, the primary side windings of a transformer should be supplied with an alternating current within that frequency range in order for the transformer to operate properly. When operating above the specific frequency range, the transformer may overheat due to an increase in magnetic flux generated within the core, which can lead to insulation failure, short circuits, or even fire. When operating below the specific frequency range, the transformer may not generate sufficient magnetic flux to fully magnetize the transformer core, which can result in a phenomenon known as magnetic saturation. In magnetic saturation, the transformer has reduced efficiency, can overheat and fail, and may have increased electromagnetic interference.

Regarding the voltage converter circuit 300 of FIG. 3, the control unit 310 causes the voltage converter circuit 300 to repeatedly cycle through various modes of operation in order to induce a proper frequency of alternating current through the primary side transformer coil 190 required by the transformer 301. FIGS. 6 through 10 will now be described in order to discuss the various modes of operation of the voltage converter circuit 300 in one example embodiment.

Figure 6:
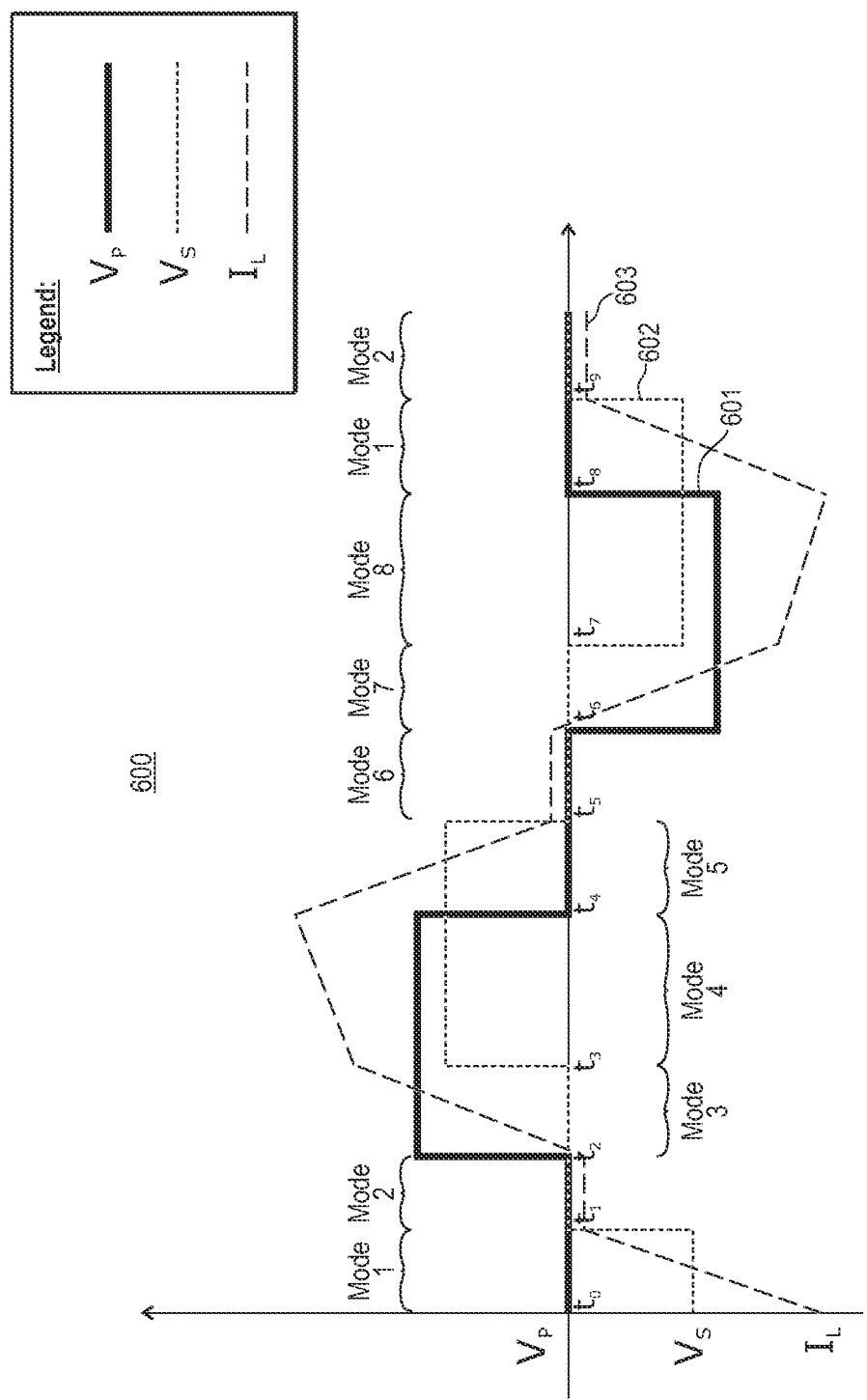
FIG. 6 illustrates a waveform diagram that shows three example waveforms over time.

FIG. 6 illustrates a waveform diagram 600 that shows three example waveforms 601, 602 and 603 over time. Time is represented on the horizontal axis and increases moving rightward. Amplitude is represented on the vertical axis. The waveform 601 is represented in solid-lined form and represents the voltage $V_P$ at one end of the parasitic inductor 180, whilst the waveform 602 is represented in dotted-lined form and represents the voltage $V_S$ at the other end of the parasitic inductor 180. For instance, in FIG. 7A, voltage $V_P$ is present at the left side of the parasitic inductor 180, and voltage $V_S$ is present at the right side of the parasitic inductor 180. The vertical position of voltage waveforms 601 and 602 represent the magnitude of the voltage where more positive voltages are higher than more negative voltages. The waveform 603 is represented in dashed-lined form and represents the current $I_L$ passing through the parasitic inductor 180, and thus through the primary side transformer coil 190. In the convention used herein, positive values of current $I_L$ occur when current is passing rightward through the parasitic inductor 180 (as represented by arrow 710). On the other hand, negative values of current $I_L$ occur when current is passing leftwards through the parasitic inductor 180.

FIG. 6 also illustrates several times $t_0$ to $t_9$ that represent time boundaries between different modes of operation of the voltage converter circuit 300. There are 8 modes of operation. Mode 1 occurs between time $t_0$ and $t_1$. Mode 2 occurs between time $t_1$ and $t_2$. This continues through to mode 8 being between time $t_7$ and $t_8$. Then the process begins again with mode 1 at time $t_8$. Each mode will now be described beginning with mode 1.

FIG. 7A illustrates the voltage converter circuit 300 operating in a state 700A that represents operating in mode 1 from time $t_0$ to $t_1$. FIG. 7B illustrates a flowchart of method 700B that describes the order in which the various switches of the voltage converter circuit 300 are switched in order to accomplish mode 1.

When mode 1 starts at time $t_0$, the voltage converter circuit 300 is already in a state in which the switches 120, 210A, 240A, 210B and 240B are off, and the switches 130, 220A, 230A, 220B and 230B are on. In mode 1, the control unit 310 provides a low signal (i.e., a "turn off" signal) for switch signal $S_4$ (see act 701 in FIG. 7B) such that the switch 140 is turned off. Next, the control unit 310 provides a high signal (i.e., a "turn on" signal) for the switch signals $S_1$ (act 702) such that the respective switch 110 is turned on.

The above-described switching of acts 701 and 702 is accomplished during a short time interval from time $t_0$ to a delay time $t_d$ as shown in FIG. 7B. The delay time $t_d$ is much shorter than the time interval between $t_0$ and $t_1$. Thus, while the switches do hold their post-switching state of operation of mode 1 from time $t_0+t_d$ until time $t_1$, FIG. 6 illustrates the effects of mode 1 on voltages $V_P$ and $V_S$ and current $I_L$ from time $t_0$ until time $t_1$, as though the switching had all occurred instantaneously at time $t_0$. Similarly, the switches will later hold their post-switching state of operation of mode 2, which will be described later, from time $t_1+t_d$ until time $t_2$. However, FIG. 6 illustrates the effects of mode 2 on voltages $V_P$ and $V_S$ and current $I_L$ from time $t_1$ until time $t_2$, as though the switching had all occurred instantaneously at time $t_1$. This pattern continues for each of the remaining modes of operation as each mode has a similar delay time $t_d$ between the time that the switching starts and ends for initiating the respective mode.

In mode 1, referring to the primary side circuit 100, current is allowed to flow along flow path 721 leftward through the parasitic inductor 180, and through the switch 130, the capacitor 170, the switch 110, the capacitor 150, and the primary side transformer coil 190. This current flow is leftward through the parasitic inductor 180 and thus the polarity in mode 1 of the current $I_L$ is negative.

Further, during mode 1, regarding the secondary side circuit 200A, current is allowed to flow through the flow path 722A, which is through the switch 220A, the secondary side transformer coil 260A, the switch 230A, and the capacitor 250A. Likewise, during mode 1, regarding the secondary side circuit 200B, current is allowed to flow through flow path 722B, which is through the switch 220B, the secondary side transformer coil 260B, the switch 230B, and the capacitor 250B.

Referring back to FIG. 6, referencing mode 1 from approximately time $t_0$ to $t_1$, the voltage $V_P$ is approximately zero volts throughout mode 1, the voltage $V_S$ is a negative voltage throughout mode 1, and the current $I_L$ starts negative but increases linearly. As an example, suppose that the voltage application nodes 101 and 102 are supplied with positive 400 volts and negative 400 volts respectively, and that the DC voltage applied across the voltage application nodes 101 and 102 is the input DC voltage to be converted. In other words, the input DC voltage across the voltage application nodes 101 and 102 would be 800 volts. Suppose that the voltage converter circuit 300 is only 95% efficient due to various losses throughout the voltage converter circuit 300. For example, such losses could include switching losses over the various switches in the voltage converter circuit 300, or magnetic losses in the transformer 301.

Suppose further that the 95% efficient voltage converter circuit 300 converts the 800 volt input DC voltage to an output DC voltage difference of 380 volts across the voltage application nodes 201A and 202A, and an output DC voltage difference of 380 volts across the voltage application nodes 201B and 202B. In this scenario, the total output voltage across the voltage application nodes 201A and 202B would be 760 volts, or 95% of the total input voltage of 800 volts. Suppose further that the node between the two capacitors 150 and 160 is at zero volts due to the capacitors 150 and 160 being relatively equal in capacitance. Suppose further that the capacitor 170 is pre-charged with positive 400 volts such that the voltage at its upper terminal is 400 volts more than the voltage at its lower terminal. Suppose further in the subject example that the secondary side transformer coil 260A has a 1:2 turn ratio with the primary side transformer coil 190, and that the secondary side transformer coil 260B also has a 1:2 turn ratio with the primary side transformer coil 190. This scenario will be referred to herein as the "subject example".

Regarding the waveform 601 of FIG. 6, as previously mentioned, the voltage $V_P$ is approximately zero volts throughout mode 1. That remains true in the subject example. That is, the voltage at the upper terminal of the capacitor 170 is 400 volts since the upper terminal is shorted to the voltage application node 101 through switch 110. The voltage at the lower terminal is zero volts due to the 400 volt drop across the capacitor 170. The lower terminal of the capacitor 170 is shorted to the left side of the parasitic inductor 180 through switch 130. Thus, the voltage $V_P$ is approximately zero volts during mode 1.

Regarding the waveform 602 of FIG. 6, in the subject example, the voltage $V_S$ at the right side of the parasitic inductor 180 would be approximately negative 380 volts for reasons now described. The secondary side transformer coils 260A and 260B would induce negative 380 volts over the primary side transformer coil 190. Recall that in the subject example, the node between the capacitors 150 and 160, and thus the node at the bottom of the primary side transformer coil 190, is at zero volts. Therefore, the negative 380 volts over the primary side transformer coil 190 would cause the voltage $V_S$ at the right side of the parasitic inductor 180 to be negative 380 volts during mode 1.

Regarding the waveform 603 of FIG. 6, the current $I_L$ through the parasitic inductor 180, assuming a constant voltage difference between $V_P$ and $V_S$, can be expressed as the following Equation 1:

$$I_L(t) = ((V_P - V_S)/L) * t + I_L(0) \qquad (1)$$

In this equation, L is the inductance of the parasitic inductor 180, t is time in seconds since the beginning of the current mode, and $I_L(0)$ is the initial current through the parasitic inductor 180 at the beginning of mode 1. Thus, from Equation 1, it is shown that the current $I_L$ increases linearly when the voltage difference $V_P - V_S$ across the parasitic inductor 180 is constant with the voltage $V_P$ at the left of the parasitic inductor 180 being more than the voltage $V_S$ at the right of the parasitic inductor 180. Thus, in FIG. 7A, the waveform 603 increases linearly in mode 1.

Further, an equation for the rate of change in current $I_L$ can be expressed as the following Equation 2:

$$\Delta I_L = (V_P - V_S)/L \qquad (2)$$

Thus, from Equation 2, regarding FIG. 6, it is shown that the change in current $I_L$ has a positive slope when $V_P$ is more than $V_S$, and is switched to having a negative slope when $V_P$ is less than $V_S$.

The voltage converter circuit 300 is structured such that, during each mode, the amount of voltage difference across any single switch is no more than half of the total voltage difference between the voltage application nodes 101 and 102. Thus, the switches can have lower voltage ratings, as opposed to if each switch had to be rated to withstand the total input voltage. Switches with lower voltage ratings are typically smaller in size, and thus allow for the voltage converter circuit 300 to be more compact overall. Further, such smaller switches also typically have better switching performance, because smaller switches typically have smaller output capacitance than larger switches. Having smaller output capacitance further assists in a switching method employed by the voltage converter circuit 300 called zero voltage switching, herein referred to as ZVS for reasons that will be described further below.

For instance, with respect to the primary side circuit 100 in mode 1, referring again to FIG. 7A, there is no voltage drop across switches 110 and 130. However, there is a 400 volt difference across either of the switches 120 and 140. This is because the 400 volt drop over the pre-charged capacitor 170 causes the input node of the switch 120 to have 400 volts, but the output node of the switch 120 to have zero volts, thus causing a 400 volt difference across the switch 120. Further, the pre-charged capacitor 170 causes the input node of the switch 140 to have zero volts, but the output node of the switch 140 is connected to the voltage application node 102, and thus the output node of the switch 140 has negative 400 volts. Therefore, there is still only a 400 volt difference across the switch 140. Accordingly, the switches in the primary side circuit 100 endure no more than half of the voltage applied across the voltage application nodes 101 and 102.

Likewise, referring to the secondary side circuits 200A and 200B, each of the switches 210A, 210B, 220A, 220B, 230A, 230B, 240A and 240B would endure voltage difference of no more than approximately 380 volts in the subject example because that is the total voltage across the voltage applications nodes 201A and 202A, and across the voltage application nodes 201B and 202B.

Continuing now with mode 2, FIG. 8A illustrates the voltage converter circuit 300 operating in a state 800A that represents operating in mode 2 from time $t_1$ to $t_2$. FIG. 8B illustrates a flowchart of a method 800B that describes the order in which the various switches of the voltage converter circuit 300 are switched in order to accomplish mode 2.

When mode 2 starts at time $t_1$, the control unit 310 provides a low signal for switch signals $S_7$ and $S_{11}$ (see act 801 in FIG. 8B). Upon receiving these low signals $S_7$ and $S_{11}$ from the control unit 310, the respective switches 230A and 230B turn off. Next, the control unit 310 provides a high signal for the switch signals $S_5$ and $S_9$ (act 802). Upon receiving these high signals $S_5$ and $S_9$ from the control unit 310, the respective switches 210A and 210B turn on.

Accordingly, during mode 2, the primary side circuit 100 does not change switching configurations compared to mode 1. Thus, the flow path 821 in the primary side circuit 100 during mode 2 is the same as the flow path 721 in the primary side circuit 100 during mode 1. However, during mode 2, regarding the secondary side circuits 200A and 200B, the flow paths have changed. That is, current is allowed to flow along flow path 822A through the switch 210A, the secondary side transformer coil 260A, and the switch 220A. Also, during mode 2, current is allowed to flow along flow path 822B through the switch 210B, the secondary side transformer coil 260B, and the switch 220B.

Referring back to FIG. 6, referencing mode 2 from approximately time $t_1$ to $t_2$, the voltage $V_P$ is approximately zero volts throughout mode 2, the voltage $V_S$ is approximately zero volts throughout mode 2, and the current $I_L$ is slightly negative but remains constant. This constant current is because the voltages $V_P$ and $V_S$ are the same during mode 2. Suppose again the scenario of the subject example.

Regarding the waveform 601 of FIG. 6, as previously mentioned, the voltage $V_P$ is approximately zero volts throughout mode 2. That remains true in the subject example during mode 2 because no switching has occurred between mode 1 and mode 2 on the primary side circuit 100. That is, the voltage at the upper terminal of the capacitor 170 is 400 volts since the upper terminal is shorted to the voltage application node 101 through switch 110. The voltage at the lower terminal is zero volts due to the 400 volt drop across the capacitor 170. The lower terminal of the capacitor 170 is shorted to the left side of the parasitic inductor 180 through switch 130. Thus, the voltage $V_P$ is approximately zero volts during mode 2.

Regarding the waveform 602 of FIG. 6, in the subject example regarding mode 2, the voltage $V_S$ at the right side of the parasitic inductor 180 would be approximately zero volts for reasons now described. The switch 210A is on and thus the top terminal of the secondary side transformer coil 260A is shorted to the voltage application node 201A. But the switch 220A is also on and thus the bottom terminal of the secondary side transformer coil 260 is also shorted to the same voltage application node 201A. Thus, the voltage across the secondary side transformer coil 260A is zero volts. Likewise, as for the secondary side circuit 200B, the switches 210B and 220B are both on, shorting both sides of the secondary side transformer coil 260B to the same voltage application node 201B. Thus, the voltage across the secondary side transformer coil 260B is also zero volts. Since there is no voltage drop over either of the secondary side transformer coils 260A and 260B, the secondary side transformer coils 260A and 260B do not induce any voltage across the primary side transformer coil 190. Recall that the node between the capacitors 150 and 160, and thus at the bottom of the primary side transformer coil 190, is at zero volts in the subject example. Therefore, the zero volt drop over the primary side transformer coil 190 causes the voltage $V_S$ at the right side of the parasitic inductor 180 to be approximately zero volts during mode 2.

Regarding the waveform 603 of FIG. 6, the current through the parasitic inductor 180 is slightly negative and constant in mode 2. Recall Equation 1 (provided here also) for the current $I_L$ through the parasitic inductor 180:

$$I_L(t) = ((V_P - V_S)/L) * t + I_L(0) \tag{1}$$

From Equation 1, regarding mode 2, it is shown that since $V_P$ and $V_S$ are approximately equal, the current $I_L$ through the parasitic inductor 180 remains approximately constant, being equal to its initial current $I_L(0)$ from the beginning of mode 2 at time $t_1$.

Note that in mode 2, because the flow path 821 of FIG. 8A is the same as flow path 721 of FIG. 7A, that the voltage drop across any transistor in the primary side circuit 100 would be at most 400 volts in the subject example. Furthermore, in the subject example, the switches in the secondary side circuits 200A and 200B will not have voltage drops greater than the total voltage difference across the respective voltage application nodes (which is 380 volts in the subject example).

Figure 9B:
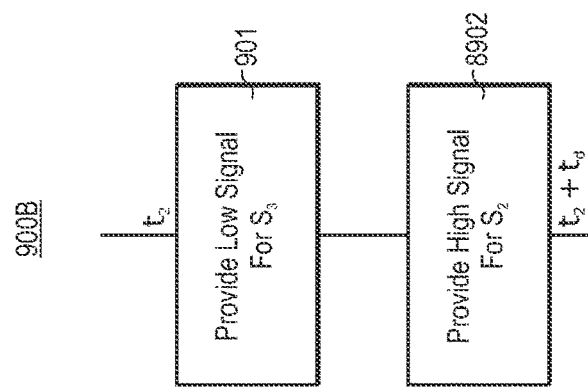
FIG. 9B illustrates a flowchart of a method that describes the order in which the various switches of the voltage converter circuit are switched in order to accomplish mode 3.
Figure 9A:
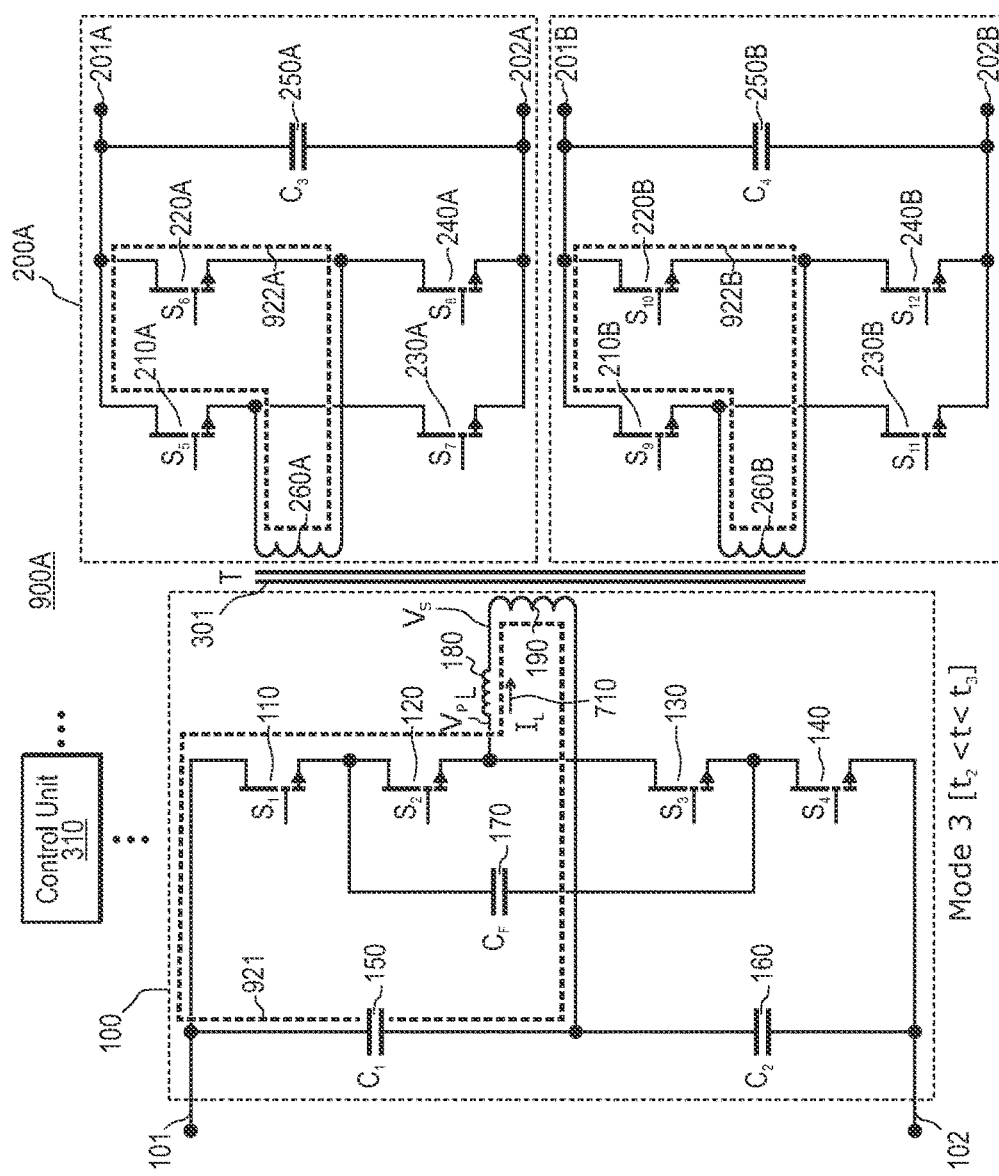
FIG. 9A illustrates the voltage converter circuit operating in a state that represents operating in mode 3 from time $t_2$ to $t_3$.

FIG. 9A illustrates the voltage converter circuit 300 operating in a state 900A that represents operating in mode 3 from time $t_2$ to $t_3$. FIG. 9B illustrates a flowchart of a method 900B that describes the order in which the various switches of the voltage converter circuit 300 are switched in order to accomplish mode 3.

When mode 3 starts at time $t_2$, the control unit 310 provides a low signal for switch signal $S_3$ (see act 901 in FIG. 9B). Upon receiving that low signal $S_3$ from the control unit 310, the switch 130 turns off. Next, the control unit 310 provides a high signal for switch signal $S_2$ (act 902). Upon receiving that high signal $S_2$ from the control unit 310, the switch 120 turns on.

Accordingly, during mode 3, the primary side circuit 100 changes switching configurations compared to mode 2. That is, in the primary side circuit 100, current is allowed to flow along flow path 921 which includes the parasitic inductor 180, and through the primary side transformer coil 190, the capacitor 150, the switch 110, and the switch 120. However, during mode 3, the secondary side circuits 200A and 200B do not change switching configurations compared to mode 2. Thus, the current paths 922A and 922B (see FIG. 9A) during mode 3 are the same as the respective current paths 822A and 822B (see FIG. 8A) during mode 2.

Referring back to FIG. 6, referencing mode 3 from approximately time $t_2$ to $t_3$, the voltage $V_P$ is a positive voltage throughout mode 3, the voltage $V_S$ is approximately zero volts throughout mode 3, and the current $I_L$ is positive and increases linearly. Suppose again the scenario of the subject example.

Regarding the waveform 601 of FIG. 6, in the subject example in mode 3, the voltage $V_P$ at the left side of the parasitic inductor 180 would be a positive 400 volts. This is because, since the switches 110 and 120 are on, the left side of the parasitic inductor 180 is shorted to the voltage application node 101, which is at positive 400 volts. Thus, the voltage $V_P$ at the left side of the parasitic inductor is also at positive 400 volts.

Regarding the waveform 602 of FIG. 6, in the subject example in mode 3, the voltage $V_S$ at the right side of the parasitic inductor 180 remains approximately zero for the same reasons as in the subject example regarding mode 2. That is, since there is no voltage drop over either of the secondary side transformer coils 260A and 260B, the secondary side transformer coils 260A and 260B do not induce any voltage to the primary side transformer coil 190. Recall that the node between the capacitors 150 and 160, and thus at the bottom of the primary side transformer coil 190, is at zero volts in the subject example. Therefore, the zero volt drop over the primary side transformer coil 190 causes the voltage $V_S$ at the right side of the parasitic inductor 180 to be approximately zero volts also during mode 3.

Regarding the waveform 603 of FIG. 6, as previously expressed in mode 3, the current $I_L$ through the parasitic inductor 180 increases linearly. In is initially negative but then becomes positive. Referring back to Equation 1, this is because the voltage $V_P$ is larger than the voltage $V_S$.

Note again that in mode 3, there the voltages across the switches is no more than 400 volts in the subject example. Specifically, for the primary side circuit 100, there is no voltage drop across switches 110 and 120. However, there is a 400 volt difference across either of the switches 130 and 140. In mode 3, the voltage between the switches 130 and 140 is at zero volts because the upper terminal of the capacitor 170 is shorted to the voltage application node 101 which is at 400 volts, and there is a 400 volt drop across the pre-charged capacitor 170. Furthermore, in the subject example, the switches in the secondary side circuits 200A and 200B will not have voltage drops greater than the total voltage difference across the respective voltage application nodes (which is 380 volts in the subject example).

Figure 10B:
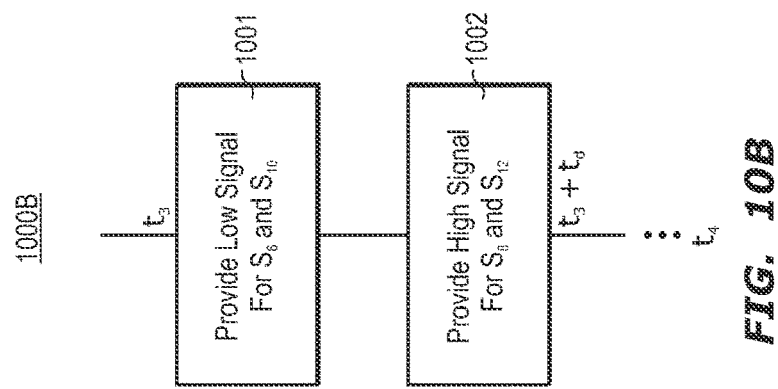
FIG. 10B illustrates a flowchart of a method that describes the order in which the various switches of the voltage converter circuit are switched in order to accomplish mode 4.
Figure 10A:
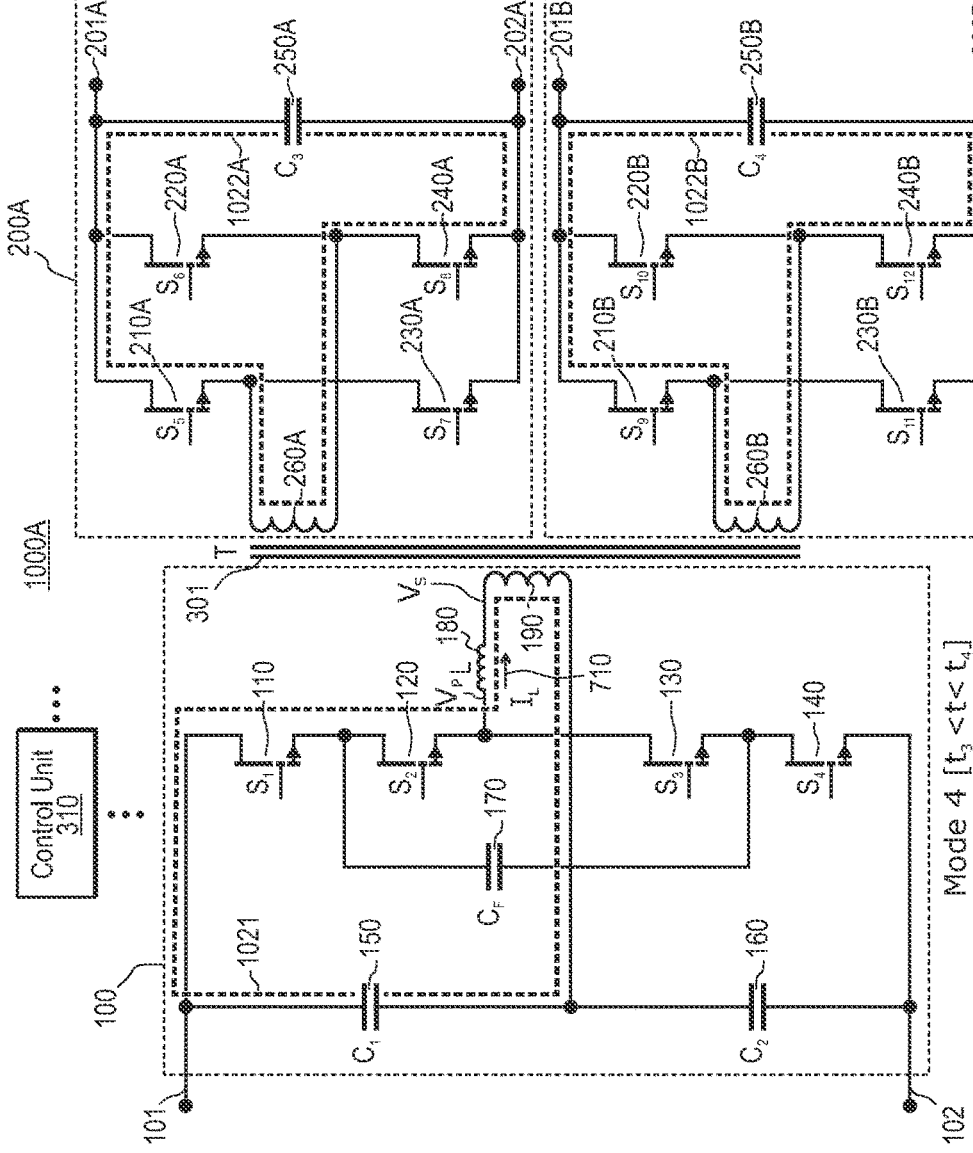
FIG. 10A illustrates the voltage converter circuit operating in a state that represents operating in mode 4 from time $t_3$ to $t_4$.

FIG. 10A illustrates the voltage converter circuit 300 operating in a state 1000A that represents operating in mode 4 from time $t_3$ to $t_4$. FIG. 10B illustrates a flowchart of a method 1000B that describes the order in which the various switches of the voltage converter circuit 300 are switched in order to accomplish mode 4.

When mode 4 starts at time $t_3$, the control unit 310 provides a low signal for switch signals $S_6$ and $S_{10}$ (see act 1001 in FIG. 10B). Upon receiving the low signals $S_6$ and $S_{10}$ from the control unit 310, the switches 220A and 220B turn off. Next, the control unit 310 provides a high signal for switch signals $S_8$ and $S_{12}$ (act 1002). Upon receiving the high signals $S_8$ and $S_{12}$ from the control unit 310, the switches 240A and 240B turn on.

Accordingly, during mode 4, the primary side circuit 100 does not change switching configurations compared to mode 3. Thus, flow path 1021 in the primary side circuit 100 during mode 4 is the same as the flow path 921 in the primary side circuit during mode 3. However, during mode 4, regarding the secondary side circuits 200A and 200B, the flow paths have again changed. That is, current is allowed to flow along flow path 1022A through the switch 210A, the secondary side transformer coil 260A, the switch 240A, and the capacitor 250A. Also, during mode 4, current is allowed to flow along flow path 1022B through the switch 210B, the secondary side transformer coil 260B, the switch 240B, and the capacitor 250B.

Referring back to FIG. 6, referencing mode 4 from approximately time $t_3$ to $t_4$, the voltage $V_P$ is a positive voltage throughout mode 4, the voltage $V_S$ is also a positive voltage throughout mode 4, and the current $I_L$ is positive and increasing with a gentle slope. Suppose again the scenario of the subject example.

Regarding the waveform 601 of FIG. 6, in the subject example in mode 4, just as in mode 3, the voltage $V_P$ at the left side of the parasitic inductor 180 would be approximately positive 400 volts, being shorted to the voltage application node 101 through the switches 110 and 120.

Regarding the waveform 602 of FIG. 6, in the subject example of mode 4, the voltage $V_S$ at the right side of the parasitic inductor 180 would be approximately positive 380 volts for the reasons now described. The secondary side transformer coils 260A and 260B would induce a positive 380 volts over the primary side transformer coil 190. Recall that in the subject example, the node between the capacitors 150 and 160, and thus the node at the bottom of the primary side transformer coil 190, is at zero volts. Therefore, the positive 380 volts over the primary side transformer coil 190 would cause the voltage $V_S$ at the right side of the parasitic inductor 180 to be a positive 380 volts during mode 4.

Regarding the waveform 603 of FIG. 6, the current $I_L$ through the parasitic inductor 180 would be positive and increase linearly with a gentle slope. This is because the voltage $V_P$ is only slightly larger than the voltage $V_S$.

Note that in mode 4, because the flow path 1021 of FIG. 10A is the same as flow path 921 of FIG. 9A, that the voltage drop across any transistor in the primary side circuit 100 would be at most 400 volts in the subject example. Furthermore, in the subject example, the switches in the secondary side circuits 200A and 200B will not have voltage drops greater than the total voltage difference across the respective voltage application nodes (which is 380 volts in the subject example).

Referring to FIG. 6, mode 5 is similar to mode 1, except in the following respects. Recall that in mode 1, the control unit 310 provided a low signal for switch signal $S_4$ and a high signal for switch signal $S_1$, which caused switch 140 to turn off and switch 110 to turn on. This was in the context of switch 120 already being off and switch 130 already being on. Conversely, in mode 5, the control unit 310 provides a low signal for switch signal $S_1$ and a high signal for switch signal $S_4$, which causes switch 110 to turn off and switch 140 to turn on. This is in the context of switch 120 already being on and switch 130 already being off. Thus, in mode 5, the voltage $V_S$ is higher than the voltage $V_P$ (rather than vice versa in mode 1), and the slope of the current $I_L$ is thus negative (rather than positive as in mode 1).

This current $I_L$ flows rightward through the parasitic inductor 180, and thus the polarity of the current $I_L$ in mode 5 is positive with a negative linear slope. This is the opposite of what occurred during mode 1. Note that, regarding the waveform 603 of FIG. 6, the current $I_L$ through the parasitic inductor 180 at the beginning of mode 5 is equal in magnitude, but opposite in sign to the current $I_L$ at the beginning of mode 1. Furthermore, the current $I_L$ through the parasitic inductor 180 at the end of mode 5 is equal in magnitude, but opposite in sign to the current $I_L$ at the end of mode 1.

Thus, because the primary side circuit 100 has the switches 110, 120, 130 and 140 in mode 5 in an opposite on-off state as compared to mode 1, the waveforms 601, 602 and 603 have vertical symmetry above the horizontal axis in FIG. 6.

This principle can be applied comparing mode 6 to mode 2 as well to achieve vertical symmetry of waveform 601, 602 and 603 between modes 6 and 2. For instance, in mode 2 (referring to FIG. 8A), switches 210A, 220A, 230A, 240A, 210B, 220B, 230B and 240B have the following respective on-off states: on, on, off, off, on, on, off, off. However, in mode 6, switches 210A, 220A, 230A, 240A, 210B, 220B, 230B and 240B have the following oppositive respective on-off states: off, off, on, on, off, off, on, on. This achieves vertical symmetric between modes 2 and 6.

This principle can be applied comparing mode 7 to mode 3 as well to achieve vertical symmetry of waveform 601, 602 and 603 between modes 7 and 3. For instance, in mode 3 (referring to FIG. 9A), switches 110, 120, 130 and 140 have the following respective on-off states: on, on off, off. However, in mode 7, switches 110, 120, 130 and 140 have the following opposite respective on-off states: off, off, on, on. This achieves vertical symmetric between modes 3 and 7.

This principle can be applied comparing mode 8 to mode 4 as well to achieve vertical symmetry of waveform 601, 602 and 603 between modes 8 and 4. For instance, in mode 4 (referring to FIG. 10A), switches 210A, 220A, 230A, 240A, 210B, 220B, 230B and 240B have the following respective on-off states: on, off, off, on, on, off, off, on. However, in mode 8, switches 210A, 220A, 230A, 240A, 210B, 220B, 230B and 240B have the following opposite respective on-off states: off, on, on, off, off, on, on, off. This achieves vertical symmetric between modes 4 and 8.

Once modes 1 through 8 have each been accomplished, at time $t_8$, the control unit 310 would again cause the voltage converter circuit 300 to operate in the state 700A representing mode 1. This transition from mode 8 to mode 1 would be accomplished by using the control unit 310 to provide a low signal for switch $S_4$, and by providing a high signal for switch signal $S_1$. That is, the transition from mode 8 to mode 1 is the same as the transition from the initial state to mode 1. Accordingly, the control unit 310 can repeat modes 1 through 8 to cause a cyclical alternating current $I_L$ to be induced through the primary side transformer coil 190.

As described above, in each mode 1 through 8, there is a time delay $t_d$ between the time that signal to turn off a switch is sent, and the time that switch is turned off. During typical voltage switching, in which ZVS is not performed, when a switch is turned on, there is a voltage difference between the input node and the output node of that switch. This causes a current to be induced through the switch before the switch is fully on, and while the switch still has a relatively large amount of internal resistance. Thus, during the transition period of the switch turning on, a large amount of power is lost due to heat. Such losses increase significantly when employing high frequency switching.

In ZVS, a switch can be turned on while there is little to no voltage difference between the input node and the output node of the switch. This is accomplished in the primary side circuit 100 via the use of the parasitic inductor 180 representing the leakage inductance of the transformer. For example, during the initial state of the primary side circuit 100, switch 120 and switch 140 were both off, and switch 110 and switch 130 were both on. In this initial state, there was a 400 volt difference between the input node and the output node of switch 140. When mode 1 was initiated, the control unit 310 caused the switch 110 to turn off. Then, due to the momentum of current caused by the leakage inductance represented by the parasitic inductor 180, the output capacitance of the switch 140 was discharged. This caused the voltage difference between the input node and the output node of switch 140 to become approximately zero. The control unit 310 then caused the switch 140 to turn on. Because there was little to no voltage drop over the switch 140, almost no current was induced through that switch 140 before it was fully on, and thus almost no power was lost due to heat when the switch 140 was turning on.

The use of smaller switches with smaller output capacitances allows for switches to be discharged faster, thus allowing switches to be turned on more quickly. This allows switching between modes to be more efficient, allows for even higher frequency of switching, and significantly reduces power losses.

The time that the voltage $V_P$ is zero volts is referred to as the "zero vector". In FIG. 6, for example, the voltage $V_P$ has zero volts from time $t_0$ to $t_2$. The time between the voltage $V_P$ becoming non-zero and the voltage $V_S$ becoming non-zero is referred to as the "phase shift". In FIG. 6, for example, the phase shift occurs between time $t_2$ (when voltage $V_P$ becomes positive) to time $t_3$ (when voltage $V_S$ becomes positive). In FIG. 6, the zero vector time is greater than the phase shift. The switching mechanisms described above with respect to FIGS. 7A through 10B are appropriate when the zero shift time is greater than the phase shift.

However, when the zero shift time is less than the phase shift, the voltages should be such that the voltage $V_P$ goes high at the beginning of mode 2, and the voltage $V_S$ stays negative through mode 2. Accordingly, in the transition from mode 1 to mode 2, the flow paths in the secondary sides 200A should be the same as the flow paths 822A and 822B, respectively, of FIG. 8A. This causes the voltage $V_S$ to remain at the same negative value as the voltage $V_S$ was in mode 1. Also, in the transition from mode 1, the primary side should have the same flow path as was shown for flow path 1021 of FIG. 10, causing the voltage $V_P$ to be positive.

Figure 11:
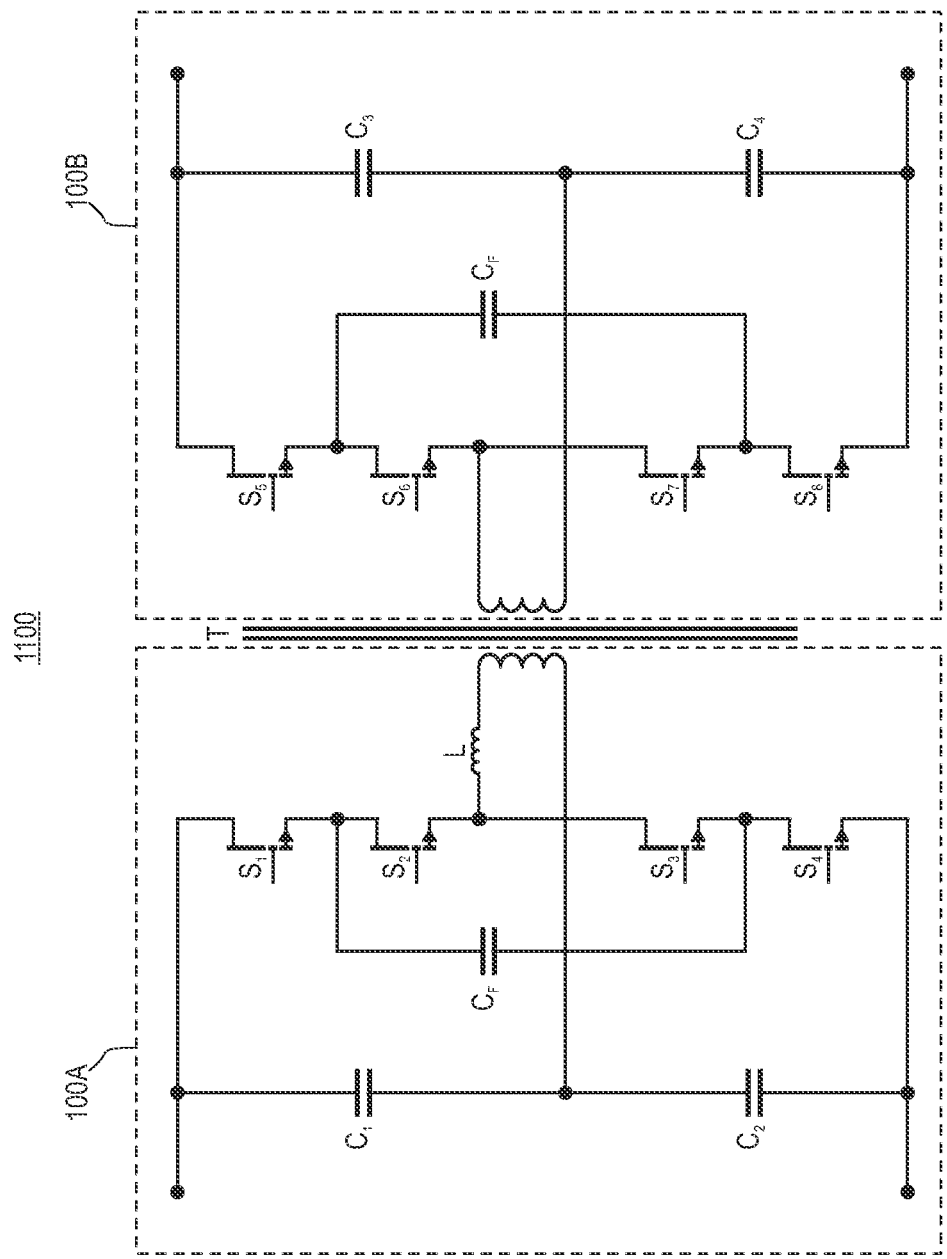
FIG. 11 illustrates a second embodiment of a voltage converter circuit including the primary side circuit of FIG. 1 acting as a primary side, as well as another instance of the primary side circuit acting as the secondary side.

FIG. 3 illustrates a first embodiment of a voltage converter circuit that has the primary side circuit 100 acting as a primary side of the voltage converter circuit. However, the principles described herein may operate with any voltage converter circuit that has the primary side circuit 100 acting as a primary side of the voltage converter circuit. For example only, FIG. 11 shows one other example of a voltage converter circuit 1100 that includes in instance 100A of the primary side circuit 100 acting as the primary side of the voltage converter circuit 100. Another instance of the primary side circuit 100B acts as the secondary side and connects with the primary side circuit 100A via a transformer T. Note however, that only the first instance of the primary side circuit 100A is shown to have the parasitic inductor 180 that represents the leakage inductance of the transformer T.

The voltage converter circuit 1100 may also operate in eight modes 1 through 8. The switching configurations attributed to the primary side circuit 100 of the voltage converter circuit 300 in modes 1 through 8 may be the same as the switching configurations for the primary side circuit 100A of the voltage converter circuit 1100. Likewise, the switching configuration attributed to the primary side circuit 100 of the voltage converter circuit 300 in modes 1 through 8 may be the same as the switching configurations for the second side circuit 100B, except offset by one mode.

Accordingly, what has been described is a DC-DC converter circuit that operates with lower voltage rated transistors and closer to zero volt switching for increased efficiency. Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Literal Support Section

Clause 1. A voltage converter circuit comprising a primary side circuit that comprises: a first switch having a first switch input node connected to a first voltage application node, the first switch further comprising a first switch output node; a second switch having a second switch input node connected to the first switch output node, the second switch further comprising a second switch output node; a third switch having a third switch input node connected to the second switch output node, third switch further comprising a third switch output node; a fourth switch having a fourth switch input node connected to the third switch output node, and a fourth switch output node connected to a second voltage application node; a first capacitor having a first capacitor node connected to the first voltage application node, the first capacitor further comprising a second capacitor node; a second capacitor having a third capacitor node connected to the second capacitor node of the first capacitor, the second capacitor further comprising a fourth capacitor node connected to the second voltage application node; a third capacitor having a fifth capacitor node connected to the first switch output node, the third capacitor also having a sixth capacitor node connected to the third switch output node; and a primary side transformer coil connected between the second switch output node and the second capacitor node of the first capacitor.

Clause 2. The voltage converter circuit according to Clause 1, the voltage converter circuit further comprising a secondary side circuit that comprises: a fifth switch having a fifth switch input node connected to a third voltage application node, the fifth switch further comprising a fifth switch output node; a sixth switch having a sixth switch input node connected to the third voltage application node, the sixth switch further comprising a sixth switch output node; a seventh switch having a seventh switch input node connected to the fifth switch output node, the seventh switch further comprising a seventh switch output node connected to a fourth voltage application node; an eighth switch having an eighth switch input node connected to the sixth switch output node, the eighth switch further comprising an eighth switch output node connected to the fourth voltage application node; a fourth capacitor having a seventh capacitor node connected to the third voltage application node, the fourth capacitor further comprising an eighth capacitor node connected to the fourth voltage application node; and a secondary side transformer coil connected between the fifth switch output node and the sixth switch output node.

Clause 3. The voltage converter circuit according to Clause 2, the secondary side transformer coil being a first secondary side transformer coil, the secondary side circuit further comprising: a ninth switch having a ninth switch input node connected to a fifth voltage application node, the ninth switch further comprising a ninth switch output node; a tenth switch having a tenth switch input node connected to the fifth voltage application node, the tenth switch further comprising a tenth switch output node; an eleventh switch having an eleventh switch input node connected to the ninth switch output node, the eleventh switch further comprising an eleventh switch output node connected to a sixth voltage application node; a twelfth switch having a twelfth switch input node connected to the tenth switch output node, the twelfth switch further comprising a twelfth switch output node connected to the sixth voltage application node; a fifth capacitor having a ninth capacitor node connected to the fifth voltage application node, the fifth capacitor further comprising a tenth capacitor node connected to the sixth voltage application node; and a second secondary side transformer coil connected between the ninth switch output node and the tenth switch output node.

Clause 4. The voltage converter circuit according to Clause 3, wherein the fourth voltage application node is connected to the fifth voltage application node.

Clause 5. The voltage converter circuit according to Clause 3, wherein the third voltage application node is connected to the fifth voltage application node, and the fourth voltage application node is connected to the sixth voltage application node.

Clause 6. The voltage converter circuit according to Clause 3, the voltage converter circuit further comprising a control unit.

Clause 7. The voltage converter circuit according to Clause 6, wherein the control unit is configured to operate in a plurality of modes of operation, a particular mode of the plurality of modes of operation being in which the control unit is configured to do the following: turn off the second switch and the fourth switch, while the second switch and the fourth switch are off, turn on the first switch and the third switch, such that current is allowed to flow from the first capacitor node, through the first switch, through the third capacitor, through the third switch, through the primary side transformer coil, and to the second capacitor node, turn off the fifth switch and the eighth switch, while the fifth switch and the eight switch are off, turn on the sixth switch and the seventh switch, such that current is allowed to flow from the seventh capacitor node, through the sixth switch, through the first secondary side transformer coil, through the seventh switch, and to the eighth capacitor node, turn off the ninth switch and the twelfth switch, and while the ninth switch and the twelfth switch are off, turn on the tenth switch and the eleventh switch, such that current is allowed to flow from the ninth capacitor node, through the tenth switch, through the second secondary side transformer coil, through the eleventh switch, and to the tenth capacitor node.

Clause 8. The voltage converter circuit according to Clause 7, the particular mode being a first mode, a second mode of the plurality of nodes of operation being in which the control unit is configured to do the following: turn off the seventh switch, while the seventh switch is off, turn on the fifth switch, such that current is allowed to flow through the fifth switch, through the first secondary side transformer coil, and through the sixth switch, turn off the eleventh switch, and while the eleventh switch is off, turn on the ninth switch, such that current is allowed to flow through the ninth switch, through the second secondary side transformer coil, and through the tenth switch.

Clause 9. The voltage converter circuit according to Clause 8, a third mode of the plurality of nodes of operation being in which the control unit is configured to do the following: turn off the third switch, and while the third switch is off, turn on the second switch, such that current is allowed to flow from the first capacitor node, though the first switch, through the second switch, through the primary side transformer coil, and to the second capacitor node.

Clause 10. The voltage converter circuit according to Clause 9, a fourth mode of the plurality of nodes of operation being in which the control unit is configured to do the following: turn off the sixth switch, while the sixth switch is off, turn on the eighth switch, such that current is allowed to flow from the seventh capacitor node, through the fifth switch, through the first secondary side transformer coil, through the eighth switch, and to the eighth capacitor node, turn off the tenth switch, and while the tenth switch is off, turn on the twelfth switch, such that current is allowed to flow from the ninth capacitor node, through the ninth switch, through the second secondary side transformer coil, through the twelfth switch, and to the tenth capacitor node.

Clause 11. The voltage converter circuit according to Clause 6, wherein the control unit is configured to operate in a plurality of modes of operation, a particular mode of the plurality of modes of operation being in which the control unit is configured to do the following: while each of the first switch, third switch, sixth switch, seventh switch, tenth switch and eleventh switch are on; and while each of the second switch, fourth switch, fifth switch, eighth switch, ninth switch and twelfth switch off, turn off the seventh switch and the eleventh switch, and turn on the fifth switch and ninth switch, such that current is allowed to flow through the fifth switch, through the first secondary side transformer coil, and through the sixth switch; and such that current is allowed to flow through the ninth switch, through the second secondary side transformer coil, and through the tenth switch.

Clause 12. The voltage converter circuit according to Clause 6, wherein the control unit is configured to operate in a plurality of modes of operation, a particular mode of the plurality of modes of operation being in which the control unit is configured to do the following: while each of the first switch, third switch, fifth switch, sixth switch, ninth switch and tenth are on; and while each of the second switch, fourth switch, seventh switch, eighth switch, eleventh switch and twelfth switch are off, turn off the third switch, and turn on the second switch, such that current is allowed to flow from the first capacitor node, though the first switch, through the second switch, through the primary side transformer coil, and to the second capacitor node; such that current is allowed to flow through the fifth switch, through the first secondary side transformer coil, and through the sixth switch; and such that current is allowed to flow through the ninth switch, through the second secondary side transformer coil, and through the tenth switch.

Clause 13. The voltage converter circuit according to Clause 6, wherein the control unit is configured to operate in a plurality of modes of operation, a particular mode of the plurality of modes of operation being in which the control unit is configured to do the following: while each of the first switch, second switch, fifth switch, sixth switch, ninth switch and tenth switch are on; and while each of the third switch, fourth switch, seventh switch, eighth switch, eleventh switch and twelfth switch are off, turn off the sixth switch and the tenth switch, and turn on the eighth switch and twelfth switch, such that current is allowed to flow from the first capacitor node, though the first switch, through the second switch, through the primary side transformer coil, and to the second capacitor node; such that current is allowed to flow from the seventh capacitor node, through the fifth switch, through the first secondary side transformer coil, through the eighth switch, and to the eighth capacitor node; and such that current is allowed to flow from the ninth capacitor node, through the ninth switch, through the second secondary side transformer coil, through the twelfth switch, and to the tenth capacitor node.

Clause 14. The voltage converter circuit according to Clause 3, the voltage converter circuit configured to perform a switching operation by: turning off a third particular switch that is one of the fifth, sixth, seventh or eighth switches; turning on a fourth particular switch that is another one of the fifth, sixth, seventh or eight switches; and waiting a period of time between the turning off of the third particular switch and the turning on of the fourth particular switch to thereby at least partially discharge a second particular switch through the primary side transformer coil prior to turning on the second particular switch.

Clause 15. The voltage converter circuit according to Clause 3, wherein each of the first switch, the second switch, the third switch, the fourth switch, the fifth switch, the sixth switch, the seventh switch, the eighth switch, the ninth switch, the tenth switch, the eleventh switch, and the twelfth switch are field-effect transistors.

Clause 16. The voltage converter circuit according to Clause 1, the voltage converter circuit configured to perform a switching operation by: turning off a first particular switch that is one of the first, second, third or fourth switches; turning on a second particular switch that is another one of the first, second, third or fourth switches; and waiting a period of time between the turning off of the first particular switch and the turning on of the second particular switch to thereby at least partially discharge the second particular switch through the primary side transformer coil prior to turning on the second particular switch.

Clause 17. The voltage converter circuit according to Clause 1, wherein each of the first switch, the second switch, the third switch, and the fourth switch are field-effect transistors.

Clause 18. The voltage converter circuit according to Clause 1, the voltage converter circuit further comprising a secondary side circuit that comprises: a thirteenth switch having a thirteenth switch input node connected to a seventh voltage application node, the thirteenth switch further comprising a thirteenth switch output node; a fourteenth switch having a fourteenth switch input node connected to the thirteenth switch output node, the fourteenth switch further comprising a fourteenth switch output node; a fifteenth switch having a fifteenth switch input node connected to the fourteenth switch output node, the fifteenth switch further comprising a fifteenth switch output node; a sixteenth switch having a sixteenth switch input node connected to the fifteenth switch output node, and a sixteenth switch output node connected to an eighth voltage application node; a sixth capacitor having an eleventh capacitor node connected to the seventh voltage application node, the sixth capacitor further comprising a twelfth capacitor node; a seventh capacitor having a thirteenth capacitor node connected to the twelfth capacitor node of the sixth capacitor, the seventh capacitor further comprising a fourteenth capacitor node connected to the eighth voltage application node; an eighth capacitor having a fifteenth capacitor node connected to the thirteenth switch output node, the eighth capacitor also having a sixteenth capacitor node connected to the fifteenth switch output node; and a secondary side transformer coil connected between the fourteenth switch output node and the twelfth capacitor node of the sixth capacitor.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A voltage converter circuit comprising a primary side circuit that comprises:
    a first switch having a first switch input node connected to a first voltage application node, the first switch further comprising a first switch output node;
    a second switch having a second switch input node connected to the first switch output node, the second switch further comprising a second switch output node;
    a third switch having a third switch input node connected to the second switch output node, the third switch further comprising a third switch output node;
    a fourth switch having a fourth switch input node connected to the third switch output node, and a fourth switch output node connected to a second voltage application node;
    a first capacitor having a first capacitor node connected to the first voltage application node, the first capacitor further comprising a second capacitor node;
    a second capacitor having a third capacitor node connected to the second capacitor node of the first capacitor, the second capacitor further comprising a fourth capacitor node connected to the second voltage application node;
    a third capacitor having a fifth capacitor node connected to the first switch output node, the third capacitor also having a sixth capacitor node connected to the third switch output node; and
    a primary side transformer coil connected between the second switch output node and the second capacitor node of the first capacitor, the voltage converter circuit configured to perform a switching operation by:
    turning off a first particular switch that is one of the first, second, third or fourth switches;
    turning on a second particular switch that is another one of the first, second, third or fourth switches; and
    waiting a period of time between the turning off of the first particular switch and the turning on of the second particular switch to thereby at least partially discharge the second particular switch through the primary side transformer coil prior to turning on the second particular switch.

2. The voltage converter circuit according to claim 1, according to claim 1, the voltage converter circuit further comprising a secondary side circuit that comprises:
    a fifth switch having a fifth switch input node connected to a third voltage application node, the fifth switch further comprising a fifth switch output node;
    a sixth switch having a sixth switch input node connected to the third voltage application node, the sixth switch further comprising a sixth switch output node;
    a seventh switch having a seventh switch input node connected to the fifth switch output node, the seventh switch further comprising a seventh switch output node connected to a fourth voltage application node;
    an eighth switch having an eighth switch input node connected to the sixth switch output node, the eighth switch further comprising an eighth switch output node connected to the fourth voltage application node;

a fourth capacitor having a seventh capacitor node connected to the third voltage application node, the fourth capacitor further comprising an eighth capacitor node connected to the fourth voltage application node; and a secondary side transformer coil connected between the fifth switch output node and the sixth switch output node.

3. The voltage converter circuit according to claim 2, the secondary side transformer coil being a first secondary side transformer coil, the secondary side circuit further comprising:

a ninth switch having a ninth switch input node connected to a fifth voltage application node, the ninth switch further comprising a ninth switch output node;

a tenth switch having a tenth switch input node connected to the fifth voltage application node, the tenth switch further comprising a tenth switch output node;

an eleventh switch having an eleventh switch input node connected to the ninth switch output node, the eleventh switch further comprising an eleventh switch output node connected to a sixth voltage application node;

a twelfth switch having a twelfth switch input node connected to the tenth switch output node, the twelfth switch further comprising a twelfth switch output node connected to the sixth voltage application node;

a fifth capacitor having a ninth capacitor node connected to the fifth voltage application node, the fifth capacitor further comprising a tenth capacitor node connected to the sixth voltage application node; and a second secondary side transformer coil connected between the ninth switch output node and the tenth switch output node.

4. The voltage converter circuit according to claim 3, wherein the fourth voltage application node is connected to the fifth voltage application node.

5. The voltage converter circuit according to claim 3, wherein the third voltage application node is connected to the fifth voltage application node, and the fourth voltage application node is connected to the sixth voltage application node.

6. The voltage converter circuit according to claim 3, the voltage converter circuit further comprising a control unit.

7. The voltage converter circuit according to claim 6, wherein the control unit is configured to operate in a plurality of modes of operation, a particular mode of the plurality of modes of operation being in which the control unit is configured to do the following:

turn off the second switch and the fourth switch, while the second switch and the fourth switch are off, turn on the first switch and the third switch, such that current is allowed to flow from the first capacitor node, through the first switch, through the third capacitor, through the third switch, through the primary side transformer coil, and to the second capacitor node, turn off the fifth switch and the eighth switch, while the fifth switch and the eight switch are off, turn on the sixth switch and the seventh switch, such that current is allowed to flow from the seventh capacitor node, through the sixth switch, through the first secondary side transformer coil, through the seventh switch, and to the eighth capacitor node, turn off the ninth switch and the twelfth switch, and while the ninth switch and the twelfth switch are off, turn on the tenth switch and the eleventh switch, such that current is allowed to flow from the ninth capacitor node, through the tenth switch, through the second secondary side transformer coil, through the eleventh switch, and to the tenth capacitor node.

8. The voltage converter circuit according to claim 7, the particular mode being a first mode, a second mode of the plurality of nodes of operation being in which the control unit is configured to do the following:

turn off the seventh switch, while the seventh switch is off, turn on the fifth switch, such that current is allowed to flow through the fifth switch, through the first secondary side transformer coil, and through the sixth switch, turn off the eleventh switch, and while the eleventh switch is off, turn on the ninth switch, such that current is allowed to flow through the ninth switch, through the second secondary side transformer coil, and through the tenth switch.

9. The voltage converter circuit according to claim 8, a third mode of the plurality of nodes of operation being in which the control unit is configured to do the following:

turn off the third switch, and while the third switch is off, turn on the second switch, such that current is allowed to flow from the first capacitor node, though the first switch, through the second switch, through the primary side transformer coil, and to the second capacitor node.

10. The voltage converter circuit according to claim 9, a fourth mode of the plurality of nodes of operation being in which the control unit is configured to do the following:

turn off the sixth switch, while the sixth switch is off, turn on the eighth switch, such that current is allowed to flow from the seventh capacitor node, through the fifth switch, through the first secondary side transformer coil, through the eighth switch, and to the eighth capacitor node, turn off the tenth switch, and while the tenth switch is off, turn on the twelfth switch, such that current is allowed to flow from the ninth capacitor node, through the ninth switch, through the second secondary side transformer coil, through the twelfth switch, and to the tenth capacitor node.

11. The voltage converter circuit according to claim 6, wherein the control unit is configured to operate in a plurality of modes of operation, a particular mode of the plurality of modes of operation being in which the control unit is configured to do the following:

while each of the first switch, third switch, sixth switch, seventh switch, tenth switch and eleventh switch are on; and while each of the second switch, fourth switch, fifth switch, eighth switch, ninth switch and twelfth switch off, turn off the seventh switch and the eleventh switch, and turn on the fifth switch and ninth switch, such that current is allowed to flow through the fifth switch, through the first secondary side transformer coil, and through the sixth switch; and such that current is allowed to flow through the ninth switch, through the second secondary side transformer coil, and through the tenth switch.

12. The voltage converter circuit according to claim 6, wherein the control unit is configured to operate in a plurality of modes of operation, a particular mode of the plurality of modes of operation being in which the control unit is configured to do the following:

while each of the first switch, third switch, fifth switch, sixth switch, ninth switch and tenth are on; and while each of the second switch, fourth switch, seventh switch, eighth switch, eleventh switch and twelfth switch are off, turn off the third switch, and turn on the second switch, such that current is allowed to flow from the first capacitor node, though the first switch, through the second switch, through the primary side transformer coil, and to the second capacitor node; such that current is allowed to flow through the fifth switch, through the first secondary side transformer coil, and through the sixth switch; and such that current is allowed to flow through the ninth switch, through the second secondary side transformer coil, and through the tenth switch.

13. The voltage converter circuit according to claim 6, wherein the control unit is configured to operate in a plurality of modes of operation, a particular mode of the plurality of modes of operation being in which the control unit is configured to do the following:

while each of the first switch, second switch, fifth switch, sixth switch, ninth switch and tenth switch are on; and while each of the third switch, fourth switch, seventh switch, eighth switch, eleventh switch and twelfth switch are off, turn off the sixth switch and the tenth switch, and turn on the eighth switch and twelfth switch, such that current is allowed to flow from the first capacitor node, though the first switch, through the second switch, through the primary side transformer coil, and to the second capacitor node; such that current is allowed to flow from the seventh capacitor node, through the fifth switch, through the first secondary side transformer coil, through the eighth switch, and to the eighth capacitor node; and such that current is allowed to flow from the ninth capacitor node, through the ninth switch, through the second secondary side transformer coil, through the twelfth switch, and to the tenth capacitor node.

14. The voltage converter circuit according to claim 3, the voltage converter circuit configured to perform a switching operation by:

turning off a third particular switch that is one of the fifth, sixth, seventh or eighth switches;

turning on a fourth particular switch that is another one of the fifth, sixth, seventh or eight switches; and waiting a period of time between the turning off of the third particular switch and the turning on of the fourth particular switch to thereby at least partially discharge a second particular switch through the primary side transformer coil prior to turning on the second particular switch.

15. The voltage converter circuit according to claim 3, wherein each of the first switch, the second switch, the third switch, the fourth switch, the fifth switch, the sixth switch, the seventh switch, the eighth switch, the ninth switch, the tenth switch, the eleventh switch, and the twelfth switch are field-effect transistors.

16. The voltage converter circuit according to claim 1, wherein each of the first switch, the second switch, the third switch, and the fourth switch are field-effect transistors.

17. The voltage converter circuit according to claim 1, the voltage converter circuit further comprising a secondary side circuit that comprises:

a thirteenth switch having a thirteenth switch input node connected to a seventh voltage application node, the thirteenth switch further comprising a thirteenth switch output node;

a fourteenth switch having a fourteenth switch input node connected to the thirteenth switch output node, the fourteenth switch further comprising a fourteenth switch output node;

a fifteenth switch having a fifteenth switch input node connected to the fourteenth switch output node, the fifteenth switch further comprising a fifteenth switch output node;

a sixteenth switch having a sixteenth switch input node connected to the fifteenth switch output node, and a sixteenth switch output node connected to an eighth voltage application node;

a sixth capacitor having an eleventh capacitor node connected to the seventh voltage application node, the sixth capacitor further comprising a twelfth capacitor node;

a seventh capacitor having a thirteenth capacitor node connected to the twelfth capacitor node of the sixth capacitor, the seventh capacitor further comprising a fourteenth capacitor node connected to the eighth voltage application node;

an eighth capacitor having a fifteenth capacitor node connected to the thirteenth switch output node, the eighth capacitor also having a sixteenth capacitor node connected to the fifteenth switch output node; and a secondary side transformer coil connected between the fourteenth switch output node and the twelfth capacitor node of the sixth capacitor.

\* \* \* \* \*